US010554758B2

(12) United States Patent
Barry et al.

(10) Patent No.: US 10,554,758 B2
(45) Date of Patent: Feb. 4, 2020

(54) WEB-CLOUD HOSTED UNIFIED PHYSICAL SECURITY SYSTEM

(71) Applicant: BluB0X Security, Inc., Andover, MA (US)

(72) Inventors: Patrick J. Barry, Sands Point, NY (US); Sean Erik Dyer, Hampstead, NH (US); Simon Goldshmid, Woburn, MA (US)

(73) Assignee: BLUB0X SECURITY, INC., Andover, MA (US)

( * ) Notice: Subject to any disclaimer, the term of this patent is extended or adjusted under 35 U.S.C. 154(b) by 0 days.

(21) Appl. No.: 15/174,198

(22) Filed: Jun. 6, 2016

(65) Prior Publication Data

US 2016/0364927 A1 Dec. 15, 2016

Related U.S. Application Data

(60) Provisional application No. 62/175,672, filed on Jun. 15, 2015.

(51) Int. Cl.
| | | |
|---|---|---|
| *H04L 29/08* | (2006.01) | |
| *H04L 29/06* | (2006.01) | |
| *G08B 25/10* | (2006.01) | |
| *H04W 4/021* | (2018.01) | |

(52) U.S. Cl.
CPC ............ *H04L 67/125* (2013.01); *G08B 25/10* (2013.01); *H04L 63/08* (2013.01); *H04L 63/10* (2013.01); *H04W 4/021* (2013.01)

(58) Field of Classification Search
CPC .............. H04L 67/125; G07C 9/00571; G07C 9/00166

USPC ......... 340/3.1, 4.31, 5.2, 5.33, 12.25, 12.29, 340/12.4

See application file for complete search history.

(56) References Cited

U.S. PATENT DOCUMENTS

| | | | |
|---|---|---|---|
| 7,796,013 B2 | 9/2010 | Murakami et al. | |
| 9,413,852 B2* | 8/2016 | Lawson | ............ G05B 19/4185 |
| 2003/0126465 A1* | 7/2003 | Tassone | ................ H04L 63/102 |
| | | | 726/4 |
| 2005/0258933 A1* | 11/2005 | Baker | ...................... H04B 3/54 |
| | | | 340/5.22 |

(Continued)

FOREIGN PATENT DOCUMENTS

WO 2015172124 A1 11/2015

OTHER PUBLICATIONS

Non-Final Office Action in U.S. Appl. No. 15/098,802, dated Feb. 22, 2018; 15 pages.

(Continued)

*Primary Examiner* — Benyam Haile
*Assistant Examiner* — Mancil Littlejohn, Jr.
(74) *Attorney, Agent, or Firm* — Schmeiser, Olsen & Watts LLP; Timothy P. Collins

(57) ABSTRACT

A system comprises a web-cloud security subsystem that hosts, manages, and analyzes data related to a plurality of hosted applications that provide at least one of physical access control, surveillance, alarm management, visitor management, and elevator management; at least one physical security subsystem that exchanges data with a corresponding hosted application of the web-cloud security subsystem; and a real-time control and monitoring device that provides secure access of the web-cloud security subsystem.

30 Claims, 13 Drawing Sheets

(56) References Cited

U.S. PATENT DOCUMENTS

| | | |
|---|---|---|
| 2006/0210119 A1 | 9/2006 | Willis et al. |
| 2006/0274921 A1 | 12/2006 | Rowe |
| 2007/0030475 A1 | 2/2007 | Rowe et al. |
| 2010/0131279 A1 | 5/2010 | Pilz |
| 2011/0276951 A1* | 11/2011 | Jain ............... G06F 11/3006 717/140 |
| 2011/0310236 A1 | 12/2011 | Rowe et al. |
| 2012/0075452 A1 | 3/2012 | Ferren |
| 2012/0158454 A1* | 6/2012 | Saunders ........ G06Q 10/0635 705/7.28 |
| 2012/0272313 A1 | 10/2012 | Ferren |
| 2012/0314911 A1 | 12/2012 | Paul et al. |
| 2013/0211559 A1* | 8/2013 | Lawson .......... G06Q 10/06315 700/83 |
| 2013/0212420 A1* | 8/2013 | Lawson ........... G05B 19/4185 713/400 |
| 2013/0214901 A1* | 8/2013 | Pineau ............... H04W 4/90 340/5.61 |
| 2014/0258446 A1* | 9/2014 | Bursell .............. G06F 15/177 709/217 |
| 2014/0331278 A1 | 11/2014 | Tkachev |
| 2014/0331282 A1 | 11/2014 | Tkachev |
| 2014/0343918 A1* | 11/2014 | Grgic ................ G05B 19/042 703/23 |
| 2015/0033305 A1 | 1/2015 | Shear et al. |
| 2015/0235074 A1 | 8/2015 | Zhang et al. |
| 2015/0271033 A1* | 9/2015 | Srivastava ......... H04L 12/2825 709/224 |
| 2015/0324303 A1* | 11/2015 | Bogorad .............. G06F 21/602 713/193 |
| 2015/0324568 A1 | 11/2015 | Publicover et al. |
| 2015/0326570 A1 | 11/2015 | Publicover et al. |
| 2016/0239723 A1* | 8/2016 | Ge .................... G06K 9/00771 |

OTHER PUBLICATIONS

Final Office Action in U.S. Appl. No. 15/098,802 dated Dec. 10, 2018; 21 pages.

Notice of Allowance in U.S. Appl. No. 15/098,802 dated Mar. 21, 2019; 12 pages.

* cited by examiner

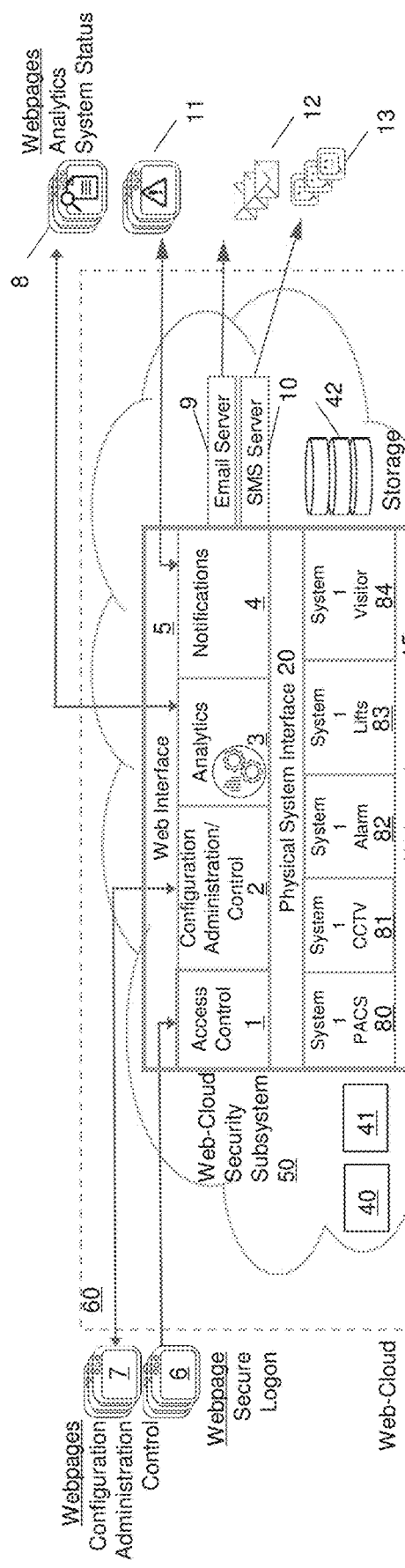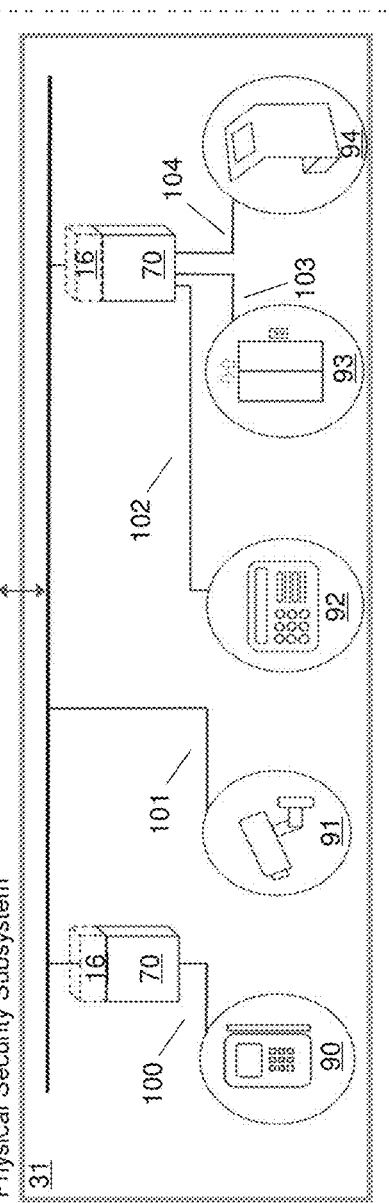
Figure 2

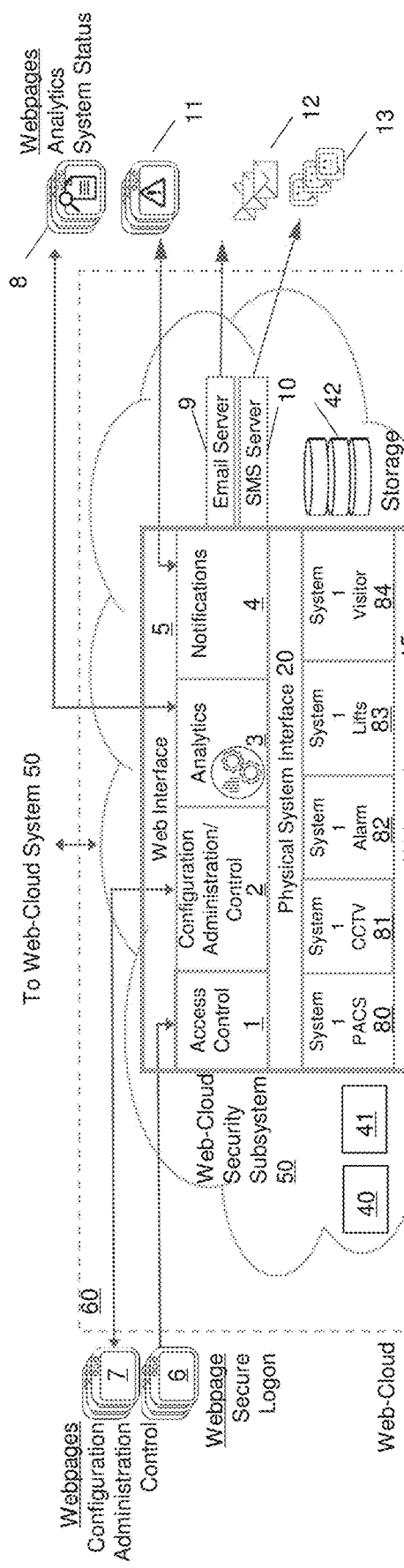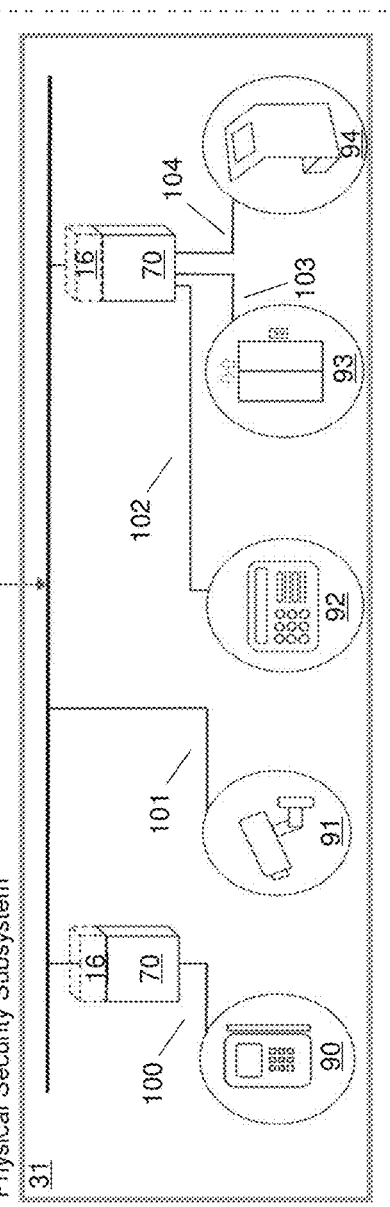
Figure 4

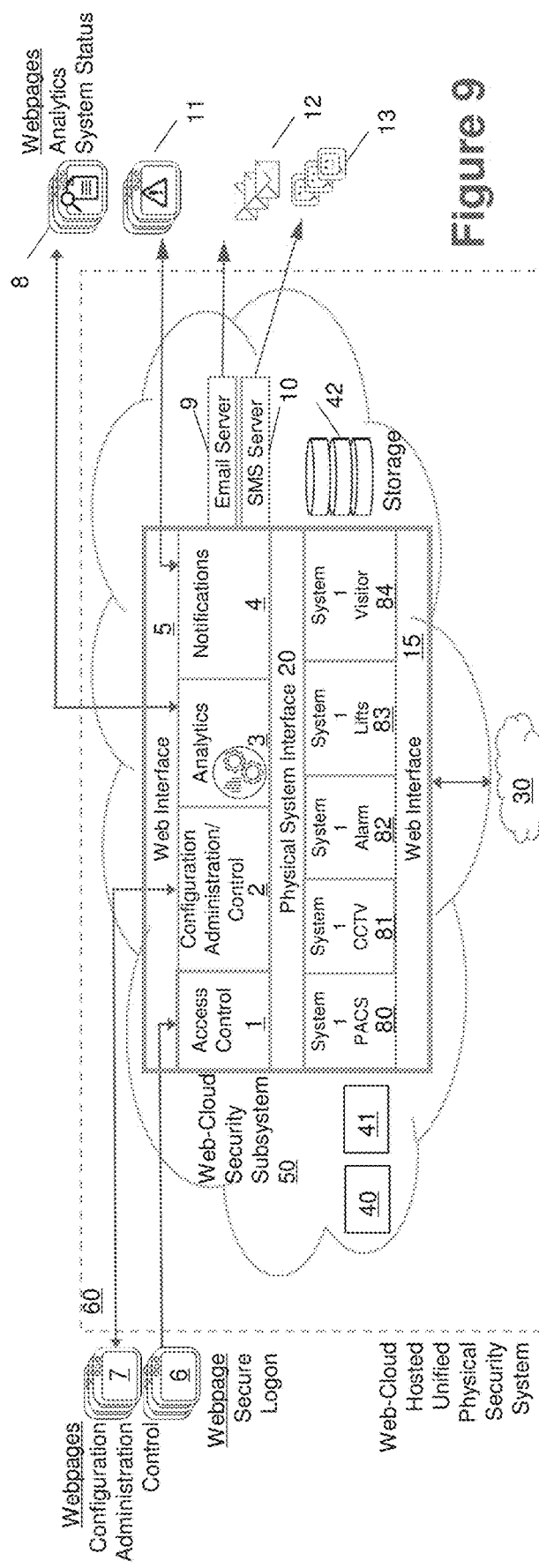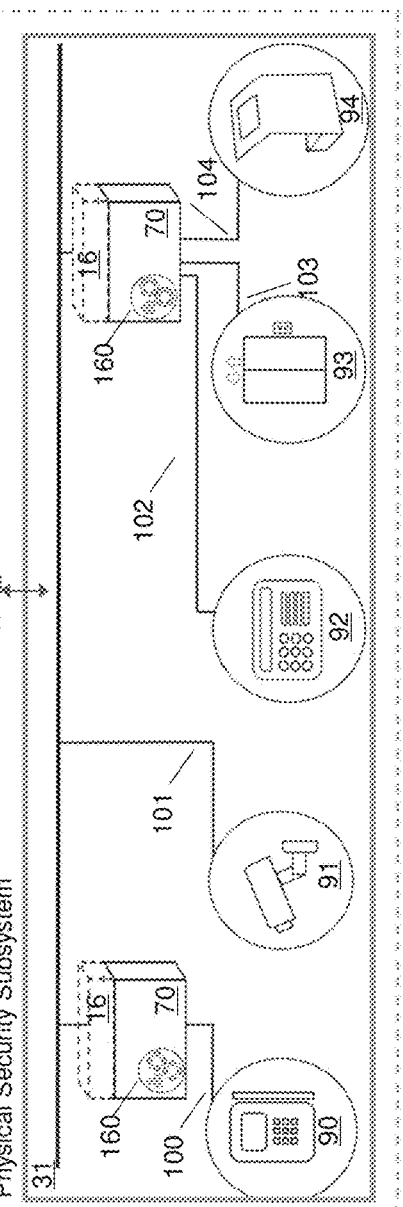
Figure 9

WEB-CLOUD HOSTED UNIFIED PHYSICAL SECURITY SYSTEM

This application claims priority to U.S. Provisional Application Ser. No. 62/175,672, filed on Jun. 15, 2015 entitled "WEB-CLOUD HOSTED UNIFIED PHYSICAL SECURITY SYSTEM", the entirety of which is incorporated by reference herein. This application is related to U.S. application Ser. No. 15/098,802, filed on Apr. 14, 2016 entitled "MULTI-FACTOR AND MULTI-MODE BIOMETRIC PHYSICAL ACCESS CONTROL DEVICE", the entirety of which is incorporated by reference herein.

FIELD

The present concepts relate generally to systems that feature aspects of physical security, and more specifically to a web-cloud based unification of these systems bound with pervasive analytics applications.

SUMMARY

Provided in one aspect is a system comprising a web-cloud security subsystem that hosts, manages, and analyzes data related to a plurality of hosted applications that provide at least one of physical access control, surveillance, alarm management, visitor management, and elevator management; at least one physical security subsystem that exchanges data with a corresponding hosted application of the web-cloud security subsystem; and a real-time control and monitoring device that provides secure access of the web-cloud security subsystem.

In some embodiments, the physical security subsystem and web-cloud security subsystem are at least one of monitored and controlled and actuated in real time by the real-time control and monitoring device.

In some embodiments, the web-cloud security subsystem is accessed through a browser interface.

In some embodiments, the web-cloud security subsystem notifies users of at least one of alarms and alerts via at least one of email, short message service (SMS), and webpage electronic communications.

In some embodiments, the web-cloud hosted applications share a common web-cloud database.

In some embodiments, the system further comprises a temporal reference device that provides a temporal reference that is shared by the hosted applications as a common web-cloud temporal reference.

In some embodiments, a web-cloud component resides in a hosted cloud and communicates with at least one of the physical security subsystem controller and device via least one of an internet connection and a wireless connection and a cellular connection and a hardwire LAN connection.

In some embodiments, a web-cloud component resides in an onsite server and communicates with at least one of the physical security controller and device via an internal network connection.

In some embodiments, a hosted application of the web-cloud subsystem that provides visitor management includes an asset management application that at least one of detects and tracks and records and reports on the at least one of presence and location and status of mobile assets.

In some embodiments, an input is generated that simulates a physical security device or controller input of the at least one physical security subsystem in such a manner as to emulate a physical input to said physical device or controller.

In some embodiments, a physical security device, in response to being virtually simulated by the web-cloud security subsystem, produces the same response as would have been produced by a physical interaction.

In some embodiments, a physical security device or a plurality of devices are simulated in at least one of a manual, periodic, aperiodic, intermittent or continuous manner to assess a compliant operation related to the at least one physical security subsystem.

In some embodiments, the at least one physical security subsystem comprises a plurality of security devices, each corresponding to at least one of the hosted cloud applications.

In some embodiments, the system provides a set of permissions that may span the entire web-cloud and physical security subsystems, or be restricted to limited aspects of the systems.

Provided in another aspect is a system comprising physical security subsystem and analytics. The physical security subsystem comprises at least one of a physical security device and device controller; a web-cloud security subsystem, wherein data is produced by at least one of the physical security subsystem and the web-cloud security subsystem, and a real-time control and monitoring device that provides secure access of the web-cloud security subsystem. The analytics reside within at least one of the physical security device and device controller and the web-cloud security subsystem and analyze at least one of physical security device data and device controller data and web-cloud data.

In some embodiments, the device data and sensor data are produced at each physical security device, and are analyzed by at least one of device analytics, device controller analytics, cloud based application analytics and cloud based system analytics.

In some embodiments, the device controller is included in at least one of the physical security device and the web-cloud security subsystem.

In some embodiments, physical security device data and analyzed data are passed from the cloud based system to at least one of the device controller and the physical security device.

In some embodiments, the data exchanged within or between the physical security subsystem and web-cloud security subsystem is analyzed and result of analysis induces at least one of a notification from the web-cloud security subsystem and the at least one physical security subsystem.

In some embodiments, the data exchanged within or between the physical security subsystem and web-cloud security subsystem is analyzed and result of analysis induces at least one of a change of state in the web-cloud security subsystem and at least one component of the at least one physical security subsystem.

In some embodiments, a configuration of at least one of the hosted applications and physical security device controllers and physical security device and physical security sensor is determined as a result of analyzed data.

In some embodiments, analytics residing within at least one of an physical security device and a physical security device controller and the hosted web-cloud detects when a system component is at least one of not operating within specification and is operating anomalously and is operating intermittently and in response at least one of generates an alert and generates a corrective action and generates a prediction of future performance.

Provided in another aspect is a system for analyzing data for virtual mustering, comprising: a physical security subsystem, comprising: a sensor for detecting an occupant; at least one physical security device the communicates with the sensor to register the presence of the occupant; and a web-cloud security subsystem that receives data collected from the sensor, and includes occupancy estimate analytics that analyzes the data to compute an occupancy result.

Provided in another aspect is a system, comprising: a web-cloud security subsystem that hosts, manages, and analyzes data related to applications of at least one of physical access control, surveillance, alarm management, visitor management, and elevator management, the web-cloud security subsystem including a plurality of hosted applications; and at least one physical security subsystem that exchanges data with a corresponding hosted application of the web-cloud security subsystem, and including a plurality of physical security devices each constructed and arranged to communicate with a hosted application, wherein the web-cloud security subsystem comprises a detection system that automatically detects the presence of newly added physical security devices and configures the new devices in accordance with prescribed protocols.

BRIEF DESCRIPTION OF THE DRAWINGS

The above and further advantages may be better understood by referring to the following description in conjunction with the accompanying drawings, in which like numerals indicate like structural elements and features in various figures. The drawings are not necessarily to scale, with emphasis instead being placed upon illustrating the principles of the concepts.

FIG. 2 illustrates Web-Cloud Hosted Unified Physical Security System, in accordance with some embodiments;

FIG. 4 illustrates a web-cloud security subsystem server hosted on site, in accordance with some embodiments;

FIG. 9 illustrates analytics in a web-cloud security subsystem and physical security subsystem controllers, in accordance with some embodiments;

DETAILED DESCRIPTION

Figure 1:
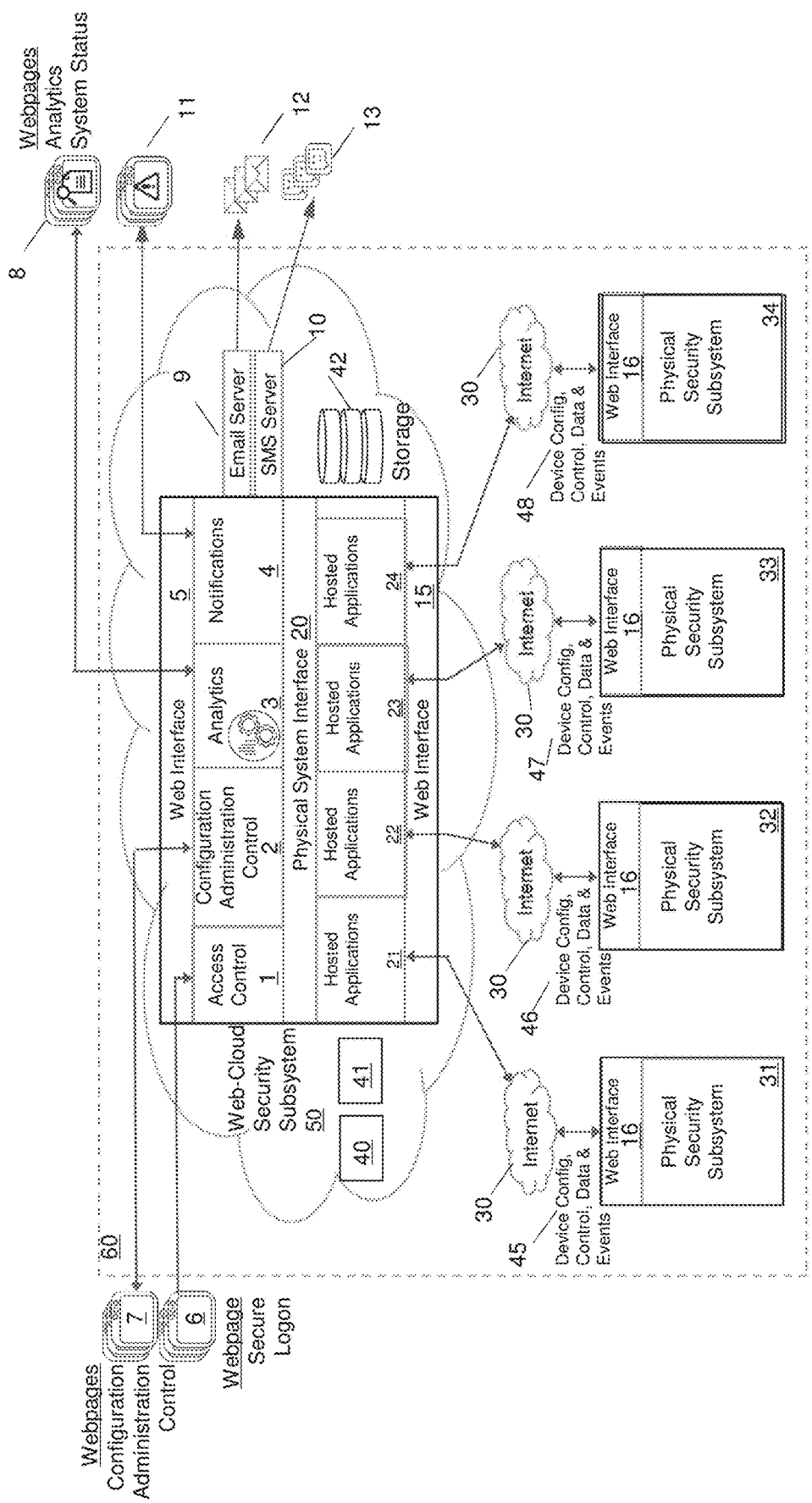
FIG. 1 illustrates a web-cloud hosted unified physical security system, in accordance with some embodiments.

A web-cloud hosted unified physical security system in accordance with embodiments of the inventive concepts comprises a single web-cloud security subsystem that hosts and supports configuration, control, management, alert notification, and analysis of a scalable set of physical security subsystems that may range from one system to a massively distributed and nearly limitless set of physical security subsystems that may be diverse in composition, complexity, geographic location and scale. A physical security subsystem may comprise a plurality of systems related to physical access control, surveillance, alarm management, visitor management and elevator management. These systems may include one or more hardware devices. The web-cloud security and physical security subsystems comprise at least one supplementary set of the foregoing systems. Users authenticate to the web-cloud security subsystem, and in accordance with their privileges, may potentially access, view, analyze and control aspects of the entire system. Another feature is that many hundreds of users can simultaneously administer the system at once. The unique feature of real time monitoring and control of many aspects of the web-cloud hosted security subsystem and physical devices through an internet enabled browser device affords users unprecedented visibility into system operation. Real time control and monitoring may be continuous if it is automated, or may be on demand if done in response to a user request. For example, popping a door open through a browser command.

Each discrete physical security subsystem has a corresponding set of hosted security applications within the web-cloud security subsystem. The web-cloud security subsystem fundamentally unifies the hosted physical security applications and application data in a manner that provides for one simple interface, a single common data repository and a flexible way of analyzing data within and across the hosted security applications. Furthermore, all hosted applications are synchronized by referencing a single common clock, enabling one set of data and record relationships to be created, withdrawn, appended and compared for unprecedented simplicity, record accuracy and operational insight.

The hosted security applications residing in the web-cloud security subsystem and their corresponding, and potentially geographically disparate, physical security subsystems may communicate via an internet connection, a LAN connection or other means depending on the system configuration, namely whether the web-cloud security system is hosted in the cloud, on an onsite server, or some hybrid of the two. The nature of the internet communications between the physical security subsystems and the web-cloud security subsystem is unique in that the physical system devices instantiate communication with the web-cloud which improves connection security and resiliency. Furthermore, the communications between the user and system may be that of a session, where bidirectional data may be exchanged between the user and the system in both a real time and forensic manner. While the web-cloud security subsystem and the physical security subsystems may communicate with each other via an internet or LAN connection, both systems are capable of performing many of their designed functions in the temporary absence of an internet connection. Here, the physical security subsystems function according to the last applied (by the web-cloud sub-system) parameters and the web-cloud subsystem stores all changes that need to be sent to the physical security subsystems. When a connection is restored the web-cloud system passes all the changed parameters to the physical security sub-system. For example, the physical security systems may have all the hardware, software and firmware necessary for executing a standalone operation in the absence of internet connectivity. Once connectivity is restored, the physical security systems will re-establish communications with the web-cloud subsystem, and exchange data that has accumulated during the communication interruption. This information exchange typically sends data in the chronological sequence that the data itself was changed but may have allowances for prioritized messages to be given priority. For example, an alarm condition in a physical security subsystem may be passed to the web-cloud system prior to a less important credential read event even though it occurred after that credential read. The web-cloud system may also prioritize messages going to the physical security subsystem. For example, a card termination message may be prioritized over a message to add a new card even if the new-card data was created first.

High volume transactional event data, such as physical access control event data, and high volume data streams such as surveillance metadata, may seamlessly be combined and analyzed with occasional data events such as alarm notifications from an alarm system, and changes to the authorized user and visitor roster. Disparate data types and formats originating from dissimilar physical security subsystem devices and technologies may be fused or passed from a physical security sub-system to web-cloud subsystem. Fusion in this context may refer to the combination of different data types and formats that describe or originate with the same event. For example, a door held open alarm from a physical access control systems (PACS) system or the like may generate several data types. One may be an XML message from the PACS controller board notifying the web-cloud of a door help open alarm. Another may be a video sequence from a proximate surveillance system that shows the event unfolding. Another may be the card ID of the user that last opened the door. Another may be a .XLS human resources record associated with the card ID that shows presents key employee data including a photo ID.

These records are consolidated in one data repository, for example, a database or the like, so that data from each corresponding hosted security application can be shared, viewed and analyzed in the context of the other applications resulting in more efficient operations, deeper and more intelligent data insights, and reduced cost over that which can be realized through a non-unified or quasi-unified architecture, for example as commonly found in client server architectures.

Through sophisticated data fusion techniques, all newly created physical security subsystem device event data and analyzed data may be combined with historical event and analytical data, and all data types, without regard to their origin, may be analyzed independently or collectively. Real time data, forensic data and analyzed data presentation may be accessible from any device supporting a browser with an internet connection, which may include but not be limited to mobile devices, tablets and desktop computers; for example, a continuous real-time control and monitoring device.

In some embodiments, the web-cloud hosted unified physical security system comprises a web-cloud security subsystem and at least one physical security subsystem. The web-cloud security subsystem may be hosted in a remote cloud or within a server proximal to the physical security subsystem.

In brief overview, each system in accordance with some embodiments may comprise the following functional components:
1. Web-cloud security subsystem
   a. Secure logical access control to web-cloud and authorized user management
   b. Physical security subsystem configuration and administration
   c. Physical security subsystem monitoring and control
   d. Analytics
   e. Notifications (webpage, email, short message service (SMS)), or other electronic communications
   f. Web interface
   g. Suites of hosted physical security applications where each suite corresponds to a physical security subsystem composition
   h. Temporal reference (time clock)
   i. Storage
   j. Processor
2. Physical security subsystem
   a. Physical access control system
   b. Surveillance system
   c. Alarm system
   d. Elevator management system
   e. Visitor management system
   f. Controllers that may accept sensor inputs, analyze sensor data, actuate transducers and communicate with external devices and servers.
   g. Software components embodied in program code, stored in hardware memory and executed by computer processors that allow individual physical security subsystem components to communicate with one another and/or with the web-cloud security subsystem and/or with other physical security subsystems.
3. A real time control and monitoring device
   a. Internet connection
   b. Browser
4. Communication components
   a. Software components that allow physical security subsystems and their components to talk directly to each other (within a given subsystem), directly to the web-cloud system 50, or to other physical security subsystems and their components 31-34 in a peer-to-peer fashion. These communications may occur over the internet, a Local Area Network or any other means supported by the hardware and software components.

Turning now to the drawings in which like reference characters indicate corresponding elements throughout the subsequent configurations, attention is first directed to FIG. 1 in which is seen a web-cloud security subsystem 50 and at least one physical security subsystem 31-34 that collectively comprise the web-cloud hosted unified physical security system 60. Although four physical security subsystems 31-34 are shown, the number of physical security subsystems is not limited thereto.

A plurality of physical security subsystems 31-34 may also interface with the web-cloud security subsystem 50 without regard to physical security subsystem geographic location or physical security subsystem size and complexity. For example, two physical security subsystems among subsystems 31-34 of dissimilar device composition may reside adjacent to one another within the same facility, whereas other diverse physical security subsystems may reside within other buildings, whereas the building locations may be anywhere in the world that includes an internet connection 30. Although a separate internet connection 30, or cloud, is shown for each physical security subsystem 31-34, a common internet may apply to some or all physical security subsystems 31-34. In this manner the number and location of discrete physical security subsystems that can be supported by the singular web-cloud security subsystem 50 is virtually limitless.

Web-Cloud Security Subsystem

The web-cloud security subsystem 50 may include a single temporal reference device 40, scalable and redundant processor 41 for executing code and a scalable and redundant storage device 42. The web-cloud security subsystem 50 and the supported physical security subsystems 31-34 may also make use of these common resources to ensure temporal device synchronization and a common data repository for device data. For example, the temporal reference device 40 may synchronize with an external international reference, such as an atomic clock, and then in turn furnish a temporal reference to related system devices that feature their own temporal reference. In this manner, the web-cloud security subsystem 50 may be synchronized with external references, and in turn serve as a reference throughout the system of this invention so that all aspects of the system are synchronized.

The web-cloud security subsystem 50 includes at least one set of hosted physical security software applications 21-24, but not limited thereto, executed in a memory device of the subsystem 50 and executed by at least one computer hardware processor. Some or all applications 21-24 may be stored in storage 42 and executed in memory.

Each application 21-24 may correspond to a physical security subsystem 31-34. For ti example, a hosted security application 21 may exchange data, commands, configuration settings and software 45 with its associated physical security subsystem 31 through an internet connection 30. The hosted security applications 21-24 interface to one or more web-cloud security subsystem function modules, for example, access control 41, administration 42, analytics 43 and/or notifications 44, through the physical system interface 20, and interface with the physical security subsystems 31-34 through a web interface 15. This web interface 15 connects field physical devices to the applications responsible to analyze and store the incoming data and also to pass users commands to the field devices. Web interface 15 is distinguished from web interface 5 shown in FIG. 3, which connects the web pages to the cloud applications responsible to interact between the user(s) and the database.

Each application 21-24 may instead correspond to a type of physical security subsystem 31-34 or one of their components. For example, a hosted security application 21 may exchange data, commands, configuration settings and software 45 with a particular type of physical security subsystem or one of its components. This may be a dedicated application that is capable of interfacing with a specific manufacturer of video management systems, access control panels or elevator control systems.

Physical Security Subsystem

A physical security subsystem 31-34 may include one or more physical security devices, and where appropriate, their respective controllers. The hardware that comprises the physical security subsystems 31-34 work in tandem with hosted security applications 21-24 of the corresponding web-cloud security subsystem 50. Physical security devices and controllers may communicate among themselves, directly to the web-cloud security subsystem 50, directly to other physical security subsystems and/or their components and/or with their hosted applications 21-24 via wired or wireless communication links.

It is emphasized that the physical security subsystem devices need not produce data of a common format, and that physical security subsystems may be comprised of a diverse set of devices producing a diversity of data types, structures and formats. By nature of web-based interface between physical security devices, physical security subsystems and the web-cloud security subsystem, all data types and formats may be easily and efficiently exchanged, interpreted, recorded and analyzed.

An example of a user's view of the system may be appreciated by referring to FIG. 2, which illustrates a web-cloud hosted unified physical security subsystem 60 depicted from the perspective of an authorized user who has access rights to a single physical security subsystem, for example, subsystem 31 of FIG. 1. FIG. 2 illustrates a system operation in accordance with some embodiments. It is emphasized that while a single physical security subsystem is depicted, that limitation is consistent with the modelled access rights of the hypothetical user, and correctly not depicted is the massively distributed nature of the entire system 60 that may feature a great plurality of physical security subsystems.

In one embodiment, a physical security subsystem may comprise one, some, or all of the following:

- One or more physical access control systems (PACS), also known as Electronic Access Control (EAC) systems, restrict access to a geographical area to an authorized participant user. In the course of requesting access to a controlled area, participant users may authenticate themselves by one of three authentication factor tests including a knowledge based test, a possession based test and a biometric test. Physical access control subsystems may be composed of devices such as readers (support factor test inputs), sensors (to determine state of controlled portal), securing devices (locks, strikes, solenoids, etc.) and momentary switches to provide participant users the ability to exit controlled areas without the need to authenticate themselves. PACS devices may interact with a controller that compares the asserted factor test solution with stored solutions, adjudicates on access being granted or denied consistent with prevailing security protocols, actuates the controlled portal to secure or unsecure the portal, and creates a log of all portal activity and states;

- One or more surveillance systems, such as Closed Circuit Television (CCTV), which use video, audio, differential heat detection, or other sensor-related technology to surveil an area and detect the presence of people, vehicles, liquids, gases, and/or other objects. These systems may output a simple trigger, or video and audio encoded in a format favorable to digital transmission and storage. These systems may employ visible, near infrared or infrared wavelength technology and may make use of illumination sources to better observe the monitored area.

- One or more intrusion alarm systems designed to produce an alarm when a condition is met, such as a door or window being opened with authorization, or the presence of a person, vehicle or object in an area. These systems are comprised of sensors, such as Passive Infrared (PIR) sensors, also known as motion detectors, position switches, glass break sensors, and alarm panels that facilitate arming, disarming, status reporting and alarm notification of the system.

- One or more elevator systems that control and manage access to floors in multi-floor facilities. Elevator systems may include control panels, user call buttons, and more sophisticated destination dispatch systems that may include a kiosk featuring an interactive display, processor, memory, and communication link.

- One or more visitor management systems that may include a camera to support capturing a visitor photo, a scanner to support capturing a visitor's demographic data, a printer to support creating a visitor credential and a kiosk to support automated visitor check-in and credential issuance. The visitor management system may also feature an asset management system that may detect the entrance of a tagged asset into a controlled area, its location throughout a controlled area or areas, and may detect its exit from a controlled area. Asset management systems may consist of an asset tag such as an adhesive barcode or RFID tag, and devices for reading tags such as barcode scanners and RFID tag readers. In other embodiments, asset management may be a standalone system, i.e., independent of visitor management.

In one embodiment, a physical security subsystem device may communicate with a web-cloud security subsystem through a dedicated controller 70 as illustrated by the physical access control device. In another embodiment, a physical security subsystem device may access the web-cloud security subsystem 50 directly through an internet connection 30 as illustrated by the surveillance device 91. In yet another embodiment, a plurality of physical security devices may communicate with the web-cloud security subsystem through a single controller 70 as illustrated 2Y, by the alarm 92, elevator 93 and visitor management 94 devices. It is understood that these illustrations are examples, and that physical security subsystems may comprise devices that feature a dedicated controller, no controller, or devices sharing a controller or a plurality of controllers.

User Permissions to the Web-Cloud Security and Physical Security Subsystems

Figure 3:
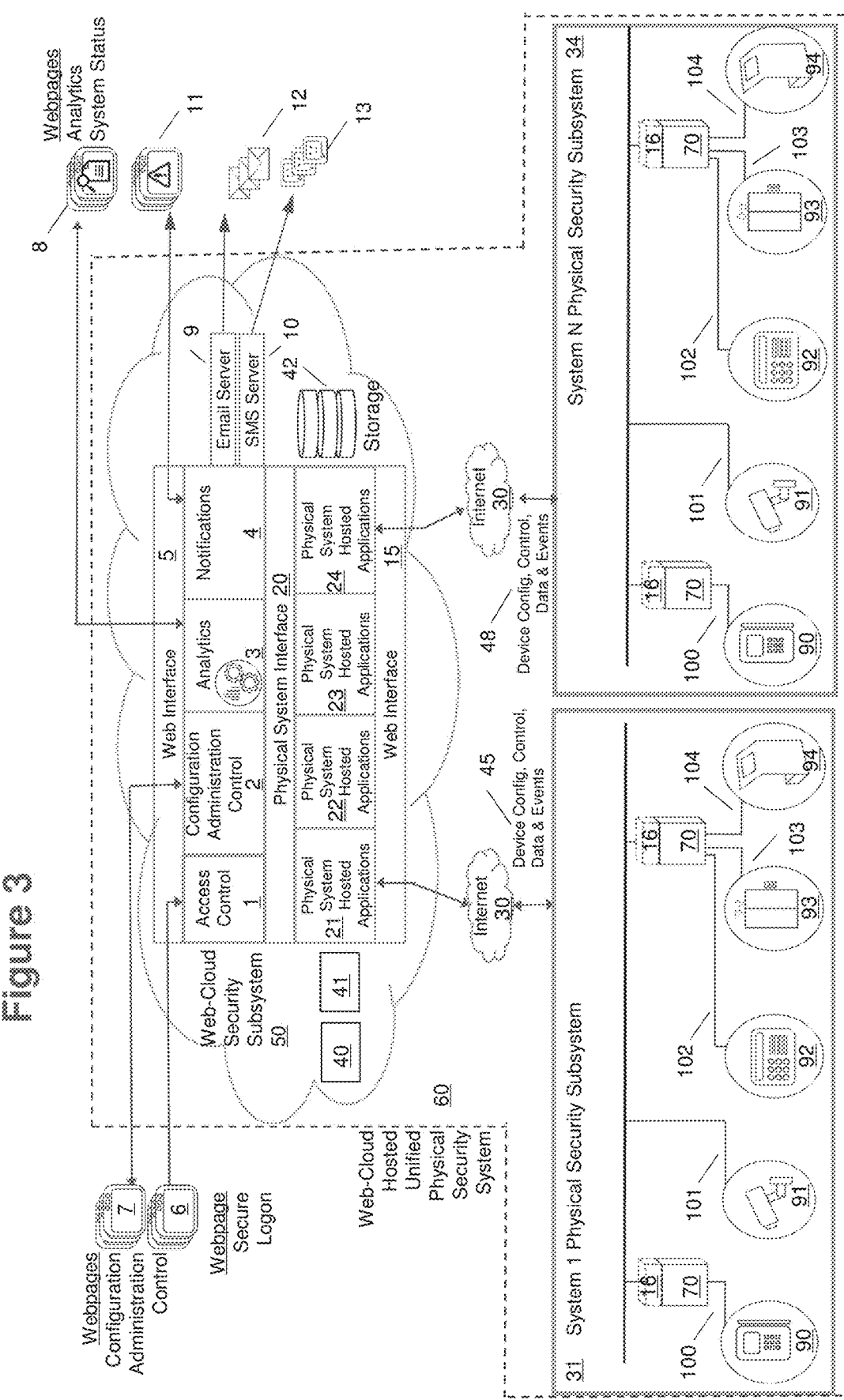
FIG. 3 illustrates a system related to user's Rights, in accordance with some embodiments.

Referring to FIG. 3, a user of the web-cloud hosted unified physical security system 60 may include but not be limited to, an administrator that oversees management, configuration and administration of the system 60, operator user that creates and manages specific physical security subsystems 31-34 and their associated hosted applications 21-24 within the web-cloud security subsystem 50, and/or a participant user who may physically use devices of one or more of the physical security subsystems 90-94.

The system 60 may be accessed through the web-cloud security subsystem 50 via an authentication protocol managed by the access control module 1. The authentication protocol may include a multi-level authentication scheme. The access control module may present the prospective user with a webpage 6 that instructs the prospective user to furnish a correct solution to at least one of the multi-factor authentication tests; namely a possession test, a knowledge test and a biometric test. The logical access control module 1 may make use of the web-cloud security subsystem temporal source 40, processing capability 41, and storage functions 42 in the prompting, evaluating and responding to access requests. For example, a prospective user attempting access to the web-cloud security subsystem 50 may use a knowledge based test to securely log on to the web-cloud security subsystem, whereas the authentication test solution may reside within the web-cloud security subsystem storage 42 and the comparison of the submitted test solution with the stored test solution may make use of the temporal source 40 and processor 41.

It will be noted that a user may successively log onto the system more than once without logging off so that multiple user sessions may occur simultaneously. Furthermore, the more than one concurrent session may occur on the same real time control and monitoring device that features an internet connection and a browser.

A user whom has been granted access, an authorized user, will enjoy a view of the web-cloud unified physical security subsystem 60 and have access to features of the system that are consistent with the access rights and permissions afforded to the user or the class of users. Permissions may span the entire web-cloud and physical security subsystems, or be restricted to limited aspects of the systems. For example, an authorized user with web-cloud security subsystem 50 administrator permissions may have expansive access to many aspects of configuring, administering and maintaining the web-cloud security subsystem 50, but have limited permissions to some or all of the physical security subsystems 31-34. Conversely an operator user associated with one of the physical security subsystems may have access to some or all aspects of that physical security subsystem, but have no view to or access to the configuration and administration aspects of the web-cloud security subsystem 50 or other physical security subsystems.

Users of any type need only be enrolled once, and this enrollment may serve throughout all aspects of the web-cloud security subsystem 50 and physical security subsystem(s) 31-34, thereby improving convenience and eliminating the risk of data entry error through multiple redundant enrollments. Similarly, when participant users are removed from the system, only one record needs to be removed. For example, a participant user may be designated permissions to a group of like devices of a physical security subsystem. Later the participant user may be granted permissions to an additional group of physical security devices. The operator user need not create a new participant user record, but simply append the permissions of the participant user's existing record.

The benefits of this approach can be appreciated when contemplating massively distributed physical security subsystems spanning the globe. For example, by nature of the inventive architecture, authorized participant users may be added, modified, deleted and in all manners managed, and the effects of each change to a user's record and associated permissions may be distributed in real time to every physical security device of every physical security subsystem for which the user is authorized.

With further regard to user access to the web-cloud security and physical security subsystems, unique to the system in accordance with some embodiments is the ability of a prospective user to "self-enroll" a user record profile, or enrollment request, which for example may be an employee, visitor or vendor enrollment request. The system allows the prospective user to create, verify, modify and delete portions of a prospective user record. For example, a prospective user can use a camera or the like to generate a photograph, for example, "a selfie", and add it to the user's record profile such that it can be subsequently used to print a badge or to support user verification. User profile is stored on a data storage device 42. Parts of the user profile that are relevant to a particular system may be duplicated on that system's storage facilities and continuously synchronized with the Storage 42. Furthermore, some relevant parts of the user profile may be also stored on a storage facilities of physical security subsystem that this user has permission rights. For example a user card number and his access rights will be stored on Storage 42 and also in storage facilities of controller 70 to which this user has access rights. When the card is removed from storage 42 by means of Access Control 1, it is also removed from controller 70 thus removing the ability of this user to access the protected geographical areas that controller 70 controls.

Once a prospective user has entered an enrollment request, an authorized user may receive a notification such as an email, SMS or webpage, by which the authorized user may review, modify, append and adjudicate on the enrollment request. In this manner the authorized user may approve aspects of the enrollment request, in whole or in part. Following the authorized user's adjudication, the prospective user may receive a notification of the enrollment request status via email, SMS text, webpage, or other electronic communication, which may include instructions for first time use, may request additional information or data, or may furnish the prospective enrollee with data such a multi-factor authentication solution.

Unique to the system is the ability of self-administering access rights based on usage statistics of a user or a group of users. For example, a newly added user of a PACS system may be granted broad access rights. Then, over time, as the authorized user passes through security portals, statistics such as what portals may be accessed, at what time of day, along with other TS metrics and measurement, may be analyzed to develop an estimate of the authorized user's normal usage patterns. These statistics and patterns may in turn be used to determine self-administered access rights that differ from the access rights originally granted to the authorized user. Likewise, if the authorized user attempts to access portals for which access is denied, the self-administering aspect of the system may determine to expand the user's access rights to include affected portals or groups of portals, or notify an administrator that a modification may be warranted.

Unique to the system is the ability for users or prospective users that are restricted from accessing a portal to be granted access to a portal, or group of portals by providing the user or prospective user a solution to at least one of the factor authentication tests that is designed to be valid for only a specified number of uses, such as one. For example, the user or prospective user may be issued a knowledge based solution such as a personal identification such as a PIN code that will permit entry one time to a portal or group of portals. The authorized user may also denote at the time of reviewing the enrollment request that access is to be granted for one time only and may also require a manual override from an authorized user.

Unique to the system is the ability to provide self-analyzing security audits. Each authorized user's historical access statistics may be analyzed by the system to compare the actual usage to the granted access rights to reveal alignment between the rights granted and actual usage. This analysis may be an automatic or manual process and the results of the analysis showing alignment or nonalignment may be shared with authorized users via email, SMS or webpage.

Inventive Feature: Delegation of User Rights

Referring once again to FIG. 3, an authorized user may confer administration rights, not to exceed the rights of the authorized user, to users or classes of users who would otherwise not enjoy such rights. This delegation of rights may include, but not be limited to, assignment of access or management rights of at least one of the physical security subsystem 31 devices which may include portals 90, cameras 91, alarm panels 92, floors 93, visitor kiosks 94, and/or other electronic devices, to new or existing users who otherwise would not have rights to manage or view devices.

To illustrate the shortcomings of a conventional PACS system, for example, a PACS system incapable of operating in a cloud environment, only the system's owners and administrators generally enjoy management access to the hardware that comprises the PACS system. In accordance with this model, owners and administrators generally assume the menial responsibility of enrolling new participant users for every aspect of the physical security system, employing a local standalone database, processor, software and network. Once participant users are enrolled, the administrator must then personally make determinations on who, within that database, should be able to access specific controlled portals. While this example deals with PACS, it is understood that the concepts may also extend to any of the physical security devices 90-94.

The invention described herein rectifies the limitations of the current art describe above using the inventive concept related to rights delegation. Continuing the PACS illustrative example, the administrator or operator user of the invention may choose to grant or "delegate" some degree of administration rights to one or more physical security subsystem devices "delegate points" to previously non-authorized users, now "delegate recipients." Delegate recipients may now enjoy some form of administrator or operator user view to the "delegated points" and administer the points to new and existing participant users. By conferring some form of administration rights to delegate recipients, administrators and operator users may be partially or wholly relieved of the burden of enrolling, un-enrolling and otherwise assiduously managing every participant user within their respective physical security subsystems. Rights delegation also places the decision of which participant user may access what physical security device into the hands of the most appropriate decision-maker, namely the participant user's direct supervisors, who enjoy a significantly higher familiarity with the prospective users than a higher level administrator whom may be several degrees of freedom removed from prospective participants. The empowerment of delegate recipients in this way also greatly reduces costs and increases efficiency for both the system owner, administrator and the operator users. For example, each participant user may be issued a single credential and granted access rights for a plurality of devices and systems without the need for approval chains, faxes, phone calls or emails to the system administrator or operator user.

Delegate recipients may not only manage their own participant users' access to all aspects of their respective physical security subsystem, but where authorized may delegate some form of rights to a plurality of physical security subsystems. For example, a delegate recipient with some form of operator user rights across a plurality of physical security subsystems 31-34 may issue credentials and access rights to operator users that permits those users to access new delegate points within their own physical security system and new delegate points within new physical security systems.

A delegation of rights from one physical security system to another may be reciprocated so that a sharing of delegated rights may exist across two or more physical security subsystems. For example, a multi-tenant office building may comprise a plurality of physical security subsystems. One physical security subsystem may be owned and administered by the property owner, and include devices such as PACS on the lobby doors, surveillance devices in the lobby and hallways, elevator management, and visitor management kiosks. Furthermore, each tenant may own and administer his or her own physical security subsystem which may comprise a PACS to secure the door, and an alarm system. The property manager may delegate rights to tenants for the delegate points of one or more PACS at the lobby and elevator access so that all tenants have access to these delegate points. Therefore, tenants may in turn create new participant users, such as family members, who will be authorized to use the delegate points of the lobby and elevator, as well as their own PACS controlled door.

Likewise, tenants may reciprocate rights delegation to the property manager for one or more delegate points, such as their respective PACS systems. In this manner, maintenance staff who requires access to the tenant space may gain access once the tenant delegates responsibility for those points out to the property manager. This rights delegation may be implemented in a single interface, potentially with a single credential, and a single transaction. For example, the issued credential that satisfies the possession authentication factor test may be valid across multiple disparate physical security subsystems. This benefits both parties.

By virtue of the inventive concepts related to a web-cloud hosted unified physical security system architecture, it is possible to create access relationships to physical security subsystems and devices not otherwise possible. For example, physical security subsystems that feature dissimilar device manufactures and device data formats would traditionally have no way of communicating with one another. However, delegated rights make assignment of shared usage rights across discrete physical security subsystems simple and efficient.

Additional examples of delegate rights include:

Rights may be delegated from an enterprise level to a plurality of physical security subsystems. For example, a large enterprise banking customer may employ the web-cloud hosted unified physical security system where a PACS controls access to a plurality of geographically disparate facilities. The bank administrator may delegate responsibility for PACS access to the bank headquarter's lobby and parking areas to each of the remote branches and office buildings. The administrators of the remote branch and office buildings security systems may in turn grant access to their participant users to the bank headquarters' lobby and parking area. Extending the example, the bank may delegate responsibility for all IT closets across all bank locations (multiple buildings, states, countries, etc.) to an information technology (IT) department, but keep all other access rights responsibilities in the hands of the enterprise security staff. In yet another example, the bank may delegate PACS rights to some controlled portals to a cleaning vendor, who would in turn manage participant access as the vendor hired, terminated and re-assigned personnel.

It is emphasized that the nature of delegating rights as described herein may apply not only across disparate physical security subsystems, but also apply to the degree of access that is granted to physical security devices 90-94. This facet of rights delegation, or permission delegation, may provide for granting a degree of access to physical security devices to personnel not otherwise permitted to view, configure, adjust, repair or in any manner alter the device. In a traditional non-cloud security system, users whom only require access to a small facet of the system or to a specific device are often granted sweeping rights as rights are handled in a simplistic binary fashion. With the invention described herein, a third party that only occasionally requires access to physical security devices, and then to only specific aspects of those devices, may be granted explicitly defined rights to effect device repair, configuration, etc.

A key attribute of user right delegation is the unique combination of data segmentation/partitioning, scope definition and web-cloud architecture.

Web-Cloud Notifications

Referring once again to FIG. 3, the web-cloud security subsystem 50 notification module 4, which includes a web interface 5, alerts an authorized user, a hierarchical series of users or a group of users to conditions or events that have been prescribed to warrant notification. The notifications module 4 may notify prescribed users of alert conditions by either serving up a web page 11 through the web interface 5, sending an email or list of emails 12 in conjunction with an email server 9, or sending an SMS message or group of SMS messages 13 in conjunction with an SMS server 10. The web-cloud security subsystem 50 may automatically detect if notifications have been received, and in response send follow-on notifications to alternative designated personnel and in alternative message formats.

Integral to web-cloud notifications is a "publish-subscribe" model. This method allows authorized users to determine which notifications to publish and recipient users to determine which notifications to subscribe to.

Integral to web-cloud notifications are distributions groups. Distribution groups can be static or dynamic, prescribed or self-organizing. Self-organizing distribution groups employ a form of the publish-subscribe model. Distribution groups are defined by authorized users and associated with web-cloud notifications implicitly or explicitly.

Integral to web-cloud notifications are notification schedules. Authorized users can specify what events may induce a notification and the timing of when a notification goes to groups and/or individuals.

Integral to web-cloud notifications are notification vessels types. Notifications can be sent via email, SMS text, webpage, application program interface (API), or other electronic communication. The authorized user has the ability to select vessel types on a per notification and per schedule basis Integral to web-cloud notifications is the ability to provide simultaneous notification via email, SMS, webpage, API, or other electronic communication.

System Configuration, Administration

Referring yet again to FIG. 3, the web-cloud security subsystem 50 may automatically detect the presence of newly added physical security devices, for example, device types 90-94 corresponding to for physical security subsystem 31, but not limited thereto, and in response may automatically configure the new devices in accordance with prescribed protocols, thereby improving configuration expediency and operational quality.

The system 60, including the web-cloud security subsystem 50 and the physical security subsystems 31-34, may be initially conceived and designed in a manner such as by placing icons, in a drag and drop fashion, of physical system components onto a template, such as a physical security subsystem template or a facility floor plan template. In this manner, a virtual physical security subsystem may be built up, by single components or groupings of components, characterized by icons that denote types of systems, devices, controllers, notifications, etc. Alternatively, a new system may be designed by copying an existing system's characterization where it may be modified in detail thereby saving time over creating a system from first principles. Normally a configuration of a PACS requires a lot of configuration parameters. Default state of input sensors, default state of output actuators, schedules, conditional behavior, points to monitor, points to control are just a few examples what needs to be configured. In many cases the systems are similar in those default parameters and only differ by the names of sensors, control and monitoring points. Copying the original system into a new one with just the changed names to those objects saves configuration time and increases the productivity of the operating personnel. The virtual system may facilitate assignment of device configurations, may facilitate generation of system quotations, and facilitate system documentation. Configuration data may be stored offsite for disaster recovery or other reason.

Real Time Control and Monitoring

Referring once again to FIG. 2, a physical security subsystem 31 is shown, with emphasis on the web interface of the device controllers 70 or the web interface of the devices themselves 91. The manner in which physical security subsystem devices 90-94, including controllers 70 coupled thereto, may communicate directly or indirectly with the web-cloud security subsystem 50, in accordance with inventive concepts, for example, via a server in communication with the controllers 70. In some embodiments, a controller 70 can be a security controller that is configured as a client and interfaces with a cloud based server via a network 30 such as the internet.

In one embodiment, the devices 90-95 or corresponding controllers 70 are responsible for initiating communications with the web-cloud security subsystem 50, as opposed to vice versa. This type of communication creates a session of open connection between the physical security system 31 and web-cloud security subsystem hosted applications 80-84 and may facilitate a conveyance of user or automated commands to the physical security subsystem devices, whereas the subsystems devices may respond by conveying device data 100-104 to the web-cloud security subsystem 50.

This bidirectional approach affords much higher physical subsystem security than conventional approaches, and does not require IT administrators responsible for the IT aspects of the physical security subsystem 31 to open an inbound port or ports in the physical system 31 network firewall or modify the rules governing inbound network and communication traffic. Furthermore, when a network connection such as an internet connection is lost between the physical security subsystem 31 and the web-cloud security subsystem 50, the controllers 70 and devices 90-94 may attempt to reinstate communications as soon as is practicable, thereby eliminating the need for the web-cloud security subsystem to expend resources on continuous vain attempts to restore the connection to the physical security subsystem. Finally, in light of the improved connectivity between the subsystems, control, monitoring and analysis of physical security controllers 70 and devices 90-94 and the data they produce 100-104 will be more effective.

Another communication feature is that authorized users through an internet browser interface 7 may configure, monitor and control all aspects of the physical security subsystems for which they are authorized as defined by the user logon. Users, through their browsers identifiers, with authorization to configure, monitor or control a physical security subsystem device are registered by the web-cloud security subsystem 50, configuration administration and control module 2. Likewise, a control module 2 of the web-cloud security subsystem 50 may authenticate controllers 70 and devices 90-94 of a physical security subsystem 31, or a plurality of subsystems, by examining the respective devices' Media Address Control (MAC) or Internet Protocol IP addresses or other identifiers within the communications.

The control module 2 may then choreograph the bidirectional data exchange between authorized users and the identified devices for which they have access. User requests, commands, etc. are routed through the control module 2 to the intended devices 90-94 of the specified physical security subsystem 31 or plurality of systems. Likewise, device data is routed through the controller web interface 16 to the web-cloud security subsystem web interface 15 where the control module 2 routes device data to all authorized users and applications that request such data. For example, an authorized user may through a browser interface 7 select a specific physical security device within a physical security subsystem and in real time reset the device, actuate a mechanical or electrical transducer, or simply monitor the device status.

Web-Cloud Analytics

The web-cloud security subsystem 50 includes an analytics module 3 that in turn includes a web interface 5. The analytics module 3 as with any other module described herein may S include program code that may be stored in a memory device and executed by a special purpose hardware processor. The analytics module 3 may draw from, recombine, fuse and otherwise analyze, some or all aspects of the web-cloud security subsystem 50 data and physical security subsystem data 45-48 to report via a webpage 8 on the health, status and efficiency of the web-cloud system 60 in historical, current and projected terms. Furthermore, the analytics module 3 may also draw from, recombine, fuse and otherwise analyze, data from some or all the physical security subsystems 31-34 to develop insights into each system's operation and performance, as well as fuse or combine data across hosted applications 21-24, as shown in FIG. 1. The web-cloud security subsystem may analyze system and device data to improve its operational performance over time through detecting data correlations, patterns and anomalies. The analytics module 3 may feature a rules based means to manually or automatically test for prescribed conditions, and in response may generate reports, additional analytics or induce notifications or configuration changes. For example, storage consumption rates and processor loading may be analyzed to verify physical security subsystems are operating with the bounds expected, and storage and processor allocations may be adapted to meet fluid operational demands. Furthermore, faults may be automatically detected and remedied. For example, an intermittent connection with a physical security device may have the system respond by inducing a power reset to the device, or to the communication equipment proximate to the device. This automated approach to system self-improvement through self-monitoring and self-healing improves system fault tolerance, improves system reliability and reduces operator involvement.

Methods and techniques of analyzing and combining data within and across devices and systems may include, but be not limited to, rules based logic, fuzzy logic, neural networks, support vector machines, Bayesian inference, etc.

Architecture Embodiment: Remote Web-Cloud and Hosted Physical Security Applications Referring again to FIG. 2, the web-cloud security subsystem 50 includes a suite of unified hosted applications composed of Physical Access Control System (PACS) 80, video and audio surveillance 81, alarm management 82, elevator management 83 and visitor management. The web-cloud hosted applications 80-84 may share a common system clock 40, a common processor 41 or plurality of hosted processors, and common storage 42. The hosted applications TS 80-84 may be configured, monitored and controlled by a configuration administration and control module 2, the data resulting from the hosted applications may be analyzed by the analytics module 3. Notifications resulting from operation of the hosted applications may be communicated by the notifications module 4, all of which are accessible through the physical system interface 20.

In one embodiment, data is produced by security devices 90-94, each corresponding to one of the hosted cloud applications 80-84. Physical security devices may include PACS peripherals or the like that satisfy at least one of the three multi-factor authentication tests 90, surveillance devices 91, alarm panels 92, elevator device 93 and/or visitor management devices 94. Data from one, some, or all of these devices may be sent in real time to a proximal internet enabled controller 70. It is noted that controllers may not be necessarily used for every security device. For example, many surveillance devices are internet enabled and may communication directly with the web-cloud security subsystem 50 without the need for an intermediate controller 70. Therefore, physical security devices may communicate with an internet enabled controller 70, or directly with the web-cloud security subsystem 50.

Internet-enabled controllers 70 proximal to physical security devices may forward security device data in either real time or store-and-forward modes to the web-cloud security subsystem 50 via an internet connection 30. Likewise, device data 100-104 is collected, stored and analyzed within the web-cloud security subsystem 50 and may result in data, commands and adjustments 100-104 being communicated back to edge devices 90-94, and their controllers 70 where employed, to adjust device operation or improve device efficacy. Data types originating at the devices 90-94 that are forwarded to the web-cloud security subsystem 50 may include connectors between the devices 90-94 and controllers 70 for providing access control event data 100, surveillance video and metadata 101, alarm notifications 102, elevator event data 103 and/or visitor management data 104. Data types originating at the web-cloud security subsystem 50 that are forwarded to devices may include software updates, operational parameter adjustments, actuation commands and status requests.

For example, a participant user attempting to access an area controlled by a physical access control device may present an identifier to the reader device embedded or connected via wires or wirelessly to reader device 90.

The identifier will be at least one of what the user knows, what the user has, or who the user is. In embodiments described herein the identifier, as a component of the access event data 100, will be forwarded to the local controller 70 where a comparison is made between the identifier presented by the user and identifiers stored by the controller. If a match is determined, the controller 70 will temporarily permit access to the portal and send a message 100 to the web-cloud security subsystem 50 describing the event details for subsequent archiving and potential analysis.

Furthermore, edge devices 90-94 and their controllers 70 may occasionally, periodically, or continuously communicate their operational and health status to the web-cloud security subsystem 50. The web-cloud security subsystem may continuously monitor all system components including edge devices and controllers and their respective communications to assess their operation. The web-cloud may send a notification 11-13 automatically if there is a rule-based test is satisfied and may include details within the notification to illuminate the nature of the alert. The web-cloud security subsystem 50 may proactively seek for potential issues that may result in degraded performance, intermittent performance or loss of performance of system components 90-94, controllers, 70, and internet connections 30. The web-cloud 50 may correct detected issues, improve performance, add new features, remove existing features, or otherwise modify the operation of edge devices 90-94 and controllers 70 by affecting changes to the operational software, firmware or configuration of the devices.

Architecture Embodiment: On Site Web-Cloud Security Subsystem and On Site Server In another embodiment as shown in FIG. 4, the data 100-104 produced by physical security devices 90-94 may be output to proximal controllers 70, recalling that controllers may not necessarily be used and device data may be sent directly to the web-cloud security subsystem by internet enabled devices. In this embodiment, the controllers 70 communicate directly with an onsite server 110 that hosts a copy of the web-cloud security subsystem 51. Subsystem 51 is a full or partial copy of the web-cloud system 50 and it may have all or only the modules and data of the system 50 that are relevant to the site where subsystem 51 is residing. Subsystem 51 in turn supports secure access 1, administration 2, analytics module reporting 3 through webpages 6-8 accessible from devices (not shown in FIG. 4) featuring a browser, which may be referred to in the web pages shown in FIG. 4.

and an internet connection. Likewise, the hosted notification module 4 may support notifications 11-13 including webpages 11, email messages 12 and SMS 13 may be supported through internet and cellular communications. Subsystem 51 communicates with the web-cloud security subsystem 50 via an internet connection where data is exchanged between the two as often as is practicable to keep the two instantiations mutually current.

Architecture Embodiment: Remote Web-Cloud Security Subsystem and on Site Server

Figure 5:
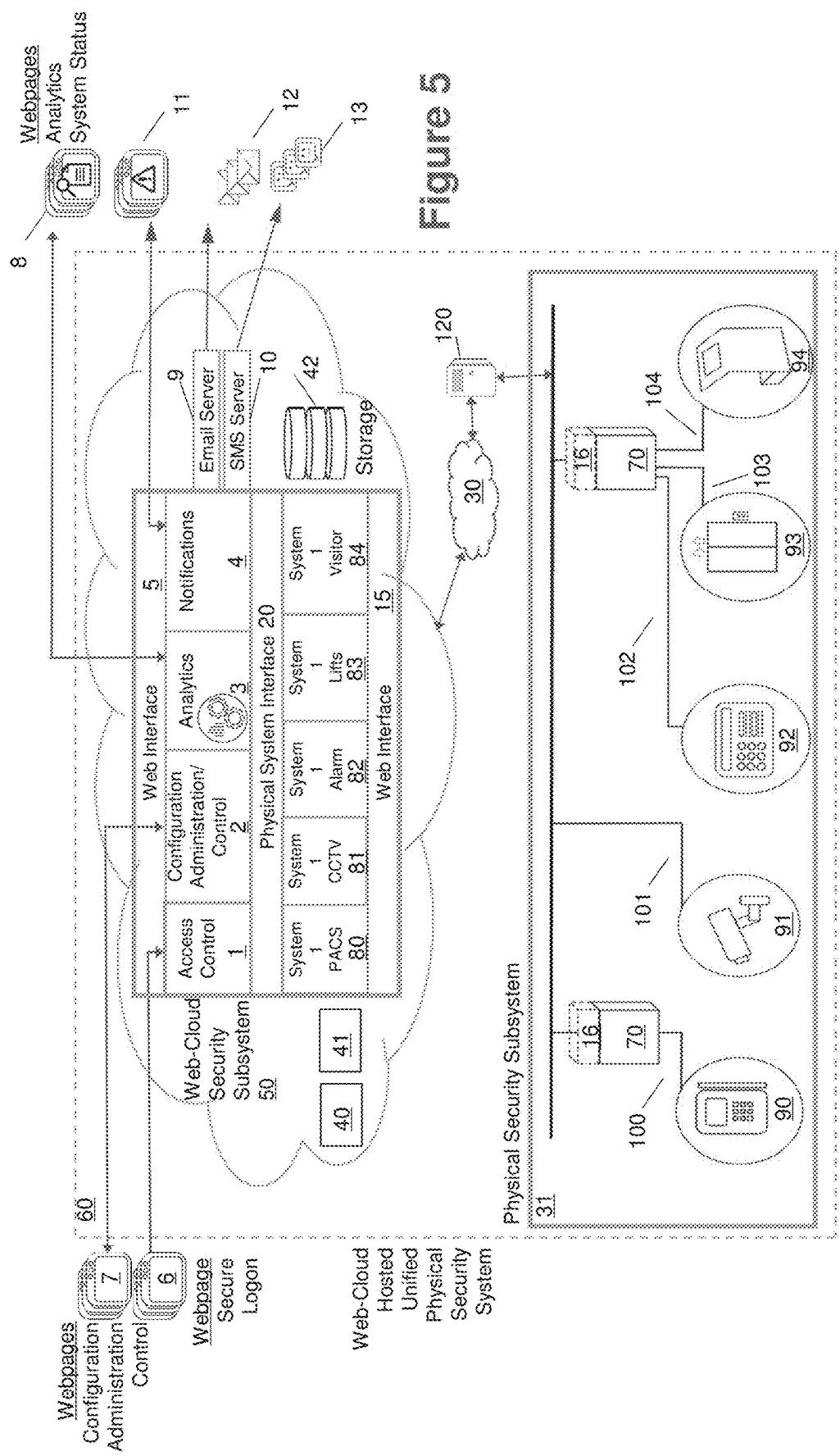
FIG. 5 illustrates a system for web-cloud security subsystem hybrid hosting, in accordance with some embodiments.

In yet another embodiment, as shown in FIG. 5, the remote web-cloud security subsystem 50 communicates with an onsite server 120 via an internet connection 30. The onsite server 120 in turn communicates with the controllers 70 of the physical security subsystem 31 or directly to internet enabled physical security devices that feature embedded controllers.

Figure 6:
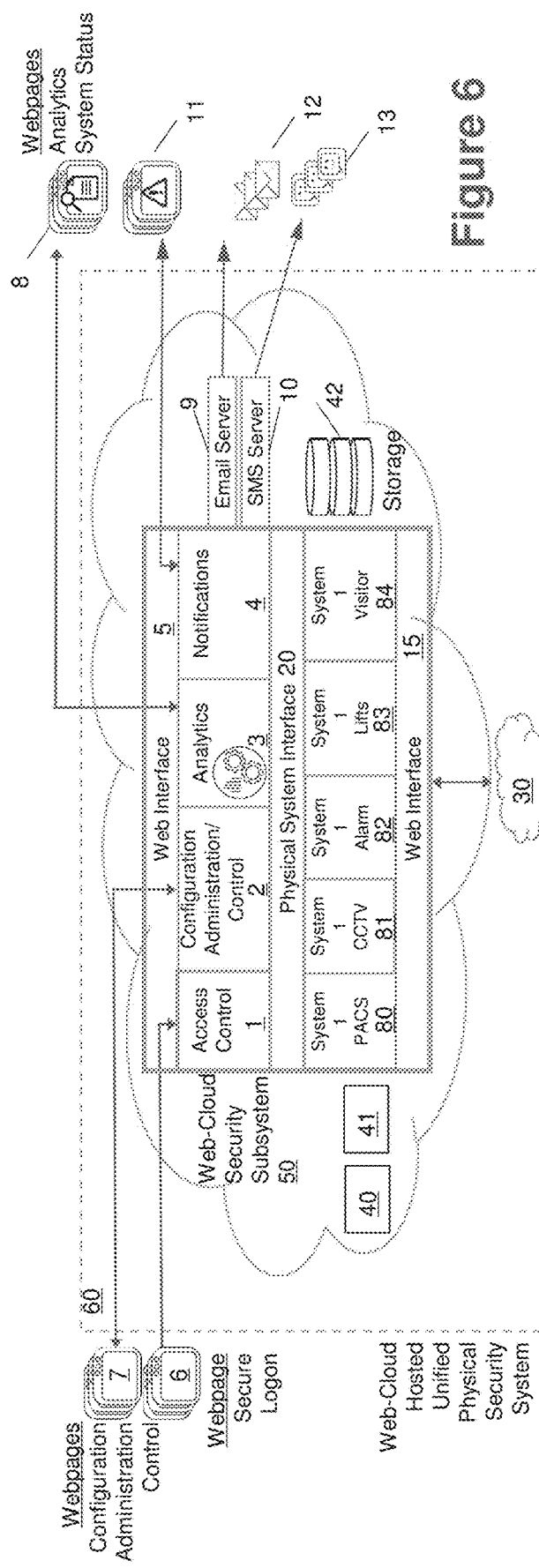
FIG. 6 illustrates controllers virtualized in a physical security subsystem device, in accordance with some embodiments.

Architecture Embodiment: Physical Security Device with Integral Virtualized Controller FIG. 6 shows an alternative embodiment where a physical security device itself is internet enabled. For the purposes of illustrating the concept, an access control reader device 130 features the functionality of the controller 131 virtualized within the physical access control reader device 130. The controller 131 may include software stored in memory and executed by a processor for performing network virtualization-related processes. Therefore, a portal secured by the access control device 130 may be monitored and controlled by the device without the need for an external controller 70. In this embodiment the security device communicates directly with the web-cloud security subsystem 50 through the internet 30. Using the embodiment of FIG. 6 as an example, a participant user requesting physical access will assert an identifier to a proximal access control reader 130 featuring an integral virtualized controller 131. This identifier will be compared to stored identifiers within the virtualized local controller 131. Access may be granted, and the portal temporarily unsecured, by the access control device 130. Event data 100 describing the event may be forwarded from the access control device 130 through the internet 30 to the web-cloud security subsystem 50 where it may be analyzed, archived or induce an action such as a notification or activation of a relay within the same or a different physical security subsystem.

Figure 7:
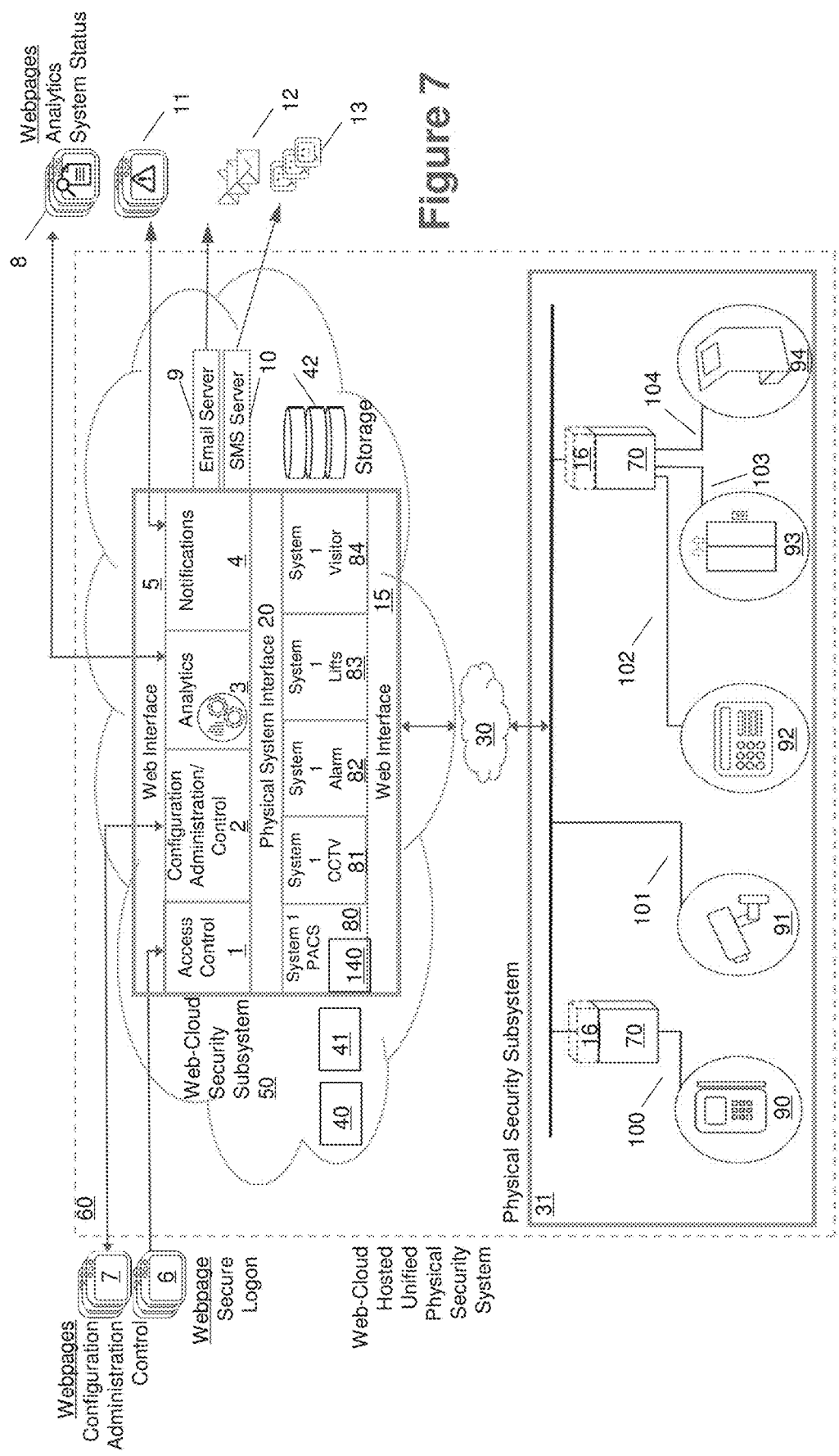
FIG. 7 illustrates controllers virtualized in a web-cloud security subsystem hosted application, in accordance with some embodiments.

Architecture Embodiment: Web-Cloud Hosted Security Application with Integral Virtualized Controller In another embodiment, as shown in FIG. 7, the functionality of the physical security device controller may be virtualized within the web-cloud security system 50 for some or all of the hosted applications 80-84. For example, the controller 140 for an access control system may be virtualized within the hosted access control application 80 located in the web-cloud security subsystem 50. The controller 140 may include software stored in memory and executed by a processor for performing network virtualization-related processes. In this embodiment, the physical security access control device 90 communicates authentication data directly with the web-cloud security subsystem 50 through an internet connection 30. Using the embodiment of FIG. 6 as an example, a participant user requesting access will assert an identifier to a local access control device 90. This identifier, as a component of the access control event data 100, will be sent through the internet connection 30 to the web-cloud security subsystem 50 where the authentication comparison is made within the virtualized controller 140 of the access control hosted application 80. If access is to be granted, the virtualized controller 140 may in turn communicate with the controlled portal within the physical security subsystem to actuate the securing mechanism or otherwise temporarily unlock the portal.

Example of Operation: Real-Time Monitoring and Control of PACS

Referring once again to FIG. 2, accurate real time monitoring of physical security device data and analyzed device data, including real time and forensic device data, may be further recalled, displayed, examined and explored by authorized administrator and operator users. For example, an authorized user may request to see a live image or video from a particular security device. In response, the web-cloud security system will pass the request to the device, or device controller if used, and facilitate viewing of the most recent image or live video stream on the user's internet enabled browser device. Likewise, a request for forensic imagery or video may have the web-cloud security system access either the device directly, if the device is capable of storing imagery, the device controller, if used, the web-cloud security subsystem storage, or some combination thereof.

These capabilities, made possible by the nature of the hosted application 80-84 unification, common database 42 and temporal reference 40, also afford real time control of all devices and controllers within the physical security subsystem 31. For example, from any internet enabled browser directly in communication with the web-cloud security subsystem 50, or indirectly in communication with an internet enabled controller 70, an authorized operator user may control and monitor in real time all aspects of the physical security devices and controllers that comprise the operator user's physical security subsystem 31.

For example, the authorized operator user may send commands directly to a control module 2 of the web-cloud security subsystem 50 where commands may be in turn be forwarded to physical security subsystem devices including but not limited to at least one of a local server, local PC, mobile device, security system controller 70 and security system devices 90-94. Successful user authentication to the web-cloud security subsystem 50 through an internet enabled browser based device begins an interaction between the web-cloud security subsystem and hosted browser web page 7, 8, 11 that is a continuous and bi-directional session. For example, when the authorized operator user is viewing the status of physical security subsystem controllers, devices and sensors interfaced to the web-cloud security subsystem 50, the reported sensor status is a real time and continuous state report, as opposed to a static "snap shot" report that requires the user to refresh the browser to view the most current sensor status. For example, in one embodiment, the state each controlled portal in a physical security system's access control system may be displayed as one of:

| Status | Result |
|---|---|
| Locked | Permanently locked (No access, even with valid credential) |
| Unlocked | Permanently unlocked (Open for everybody) |
| Multi-Factor Access | Locked - Valid multi-factor test response are admitted |
| Unknown | Status has not been reported (indicates some type of failure) |
| Alarm | Indicates that the physical portal (for example a door or a turnstile) is forced or held |

Therefore, the inventive concepts described herein provides authorized administrators and operator users with the ability in real time to at least one of monitor, lock, unlock, reset, clear and otherwise configure and control portals, which may be extended to elevators, video surveillance systems, alarm systems, visitor management systems and their asset management systems from any device with a browser and an internet connection.

Furthermore, the above functionality can be applied concurrently to a plurality of security devices, including by way of example and not limitation, all of the controlled portals within a floor, all of the portals within an entire facility or all of the portals across a plurality of disparate facilities. Therefore, when the administrator or operator user has identified a plurality of access points to be controlled, a single command, (e.g., mouse click or touch on touchpad, etc.) will affect all the selected portal doors simultaneously. This is achieved without requiring the user to log in and out of different systems, and may be realized by a single secure logon to the web-cloud security subsystem 50 from any device with a browser and internet connection.

Example of Operation: Real Time Monitoring and Control of Elevators

An authorized user with access to a browser and an internet connection may monitor and control the security status (open, locked, unlocked), physical status, position and control logic of any elevator in a facility or across a plurality of facilities for which the user is authorized to control.

Example of Operation: Multi-User and Multi-Site Administration

Another feature is the ability to drive two or more disparate systems each having a different ownership from the same cloud database, permitting the sharing of access, and combining into access groups, for example, combining points/entities from different systems (PACS, cameras, alarms, etc.) into access levels and groups for administration, permission management and assignment.

A related feature is the driving of multiple disparate systems from one interface.

In some embodiments, provided is a system and method for multi-user, multi-site administration across disparate access control systems. A web/cloud based solution provides elastic-scalability—a cost-effective means of expanding the system's computing capabilities to deal with many concurrent users when needed and then scaling back on computing power and costs when fewer users are present. This elastic nature minimizes costs incurred by any single access control system's owner by eliminating up-front server costs to run their system as well as preventing them from having to over-acquire hardware in advance in order to accommodate future projected need. In a cloud-based access control system, as the needs of the system increase, the infrastructure to support it automatically increases as well, with no performance impact on the customer and no pre-paying for unused, future capacity.

Non-cloud systems are not constructed to work on a distributed system of servers, which limits their concurrency to the capabilities of a single server which often can only support a few simultaneous users. In contrast, a cloud-based system in accordance with some embodiments may be constructed and arranged to work within a distributed environment and to take advantage of the computing power of multiple machines across every aspect of the application.

Embodiments of the present inventive concepts provide a cloud-based solution that allows the end-user to administer systems that are physically separated as well as systems that would otherwise be logically and technically separated via a single user interface. Here, a system is constructed to work within a distributed environment and to take advantage of the computing power of multiple machines across every aspect of the application, thereby supporting any number of users, and by increasing capacity on demand without need for service disruptions while additional hardware is brought online.

Through a system of permissions, users can view, configure and administer all aspects of not only PACS systems, but also any other components of security, alarms, and building control systems from multiple, disparate manufacturers across all of their own systems as well as others due to a shared data-store and user interface within the cloud. The solution allows the user to selectively share administrative duties of their systems with other trusted parties that do not own any of the components of the systems being managed. Likewise, they can administer components of other parties' systems as if it was part of their own systems, for example, in the delegation of user rights, as described above. The solution enables them to combine entities from each of the separate hardware systems that they can manage into logical groups for administration, assignment and reporting purposes. The end-user can run combined reports and perform data analysis of events and records generated by each of these disparate hardware systems. By combining all of this data in a single, cloud-based data-store, the end user can gain a more holistic understanding of the interplay of events across each type of hardware system regardless of geographical, manufacturer and even ownership of the target systems.

Example of Operation: Visitor Asset Tracking

An authorized user may register a visitor, assign visitor access rights, and register the visitor's asset, such as a laptop by capturing the visitor's demographic data once. By nature of the unified hosted applications, the authorized user need only register the visitor in one hosted system at one time, for the visitor to be available to the other hosted systems. For example, an authorized user may register the visitor in the visitor management system, and then assign access rights in the PACS system and elevator management system, as well as register the visitor's asset, without the need to re-enter the visitor's demographic data. To extend the example, if the tagged asset was recovered from a lost state, in some embodiments it is scanned by the asset management system and associated with the visitor's host.

In some embodiments when the web-cloud security subsystem hosts, manages, and analyzes data related to a visitor management application, an authorized user sets up a visitor pre-registration in the web-cloud, issues a visitor a PIN and sends it to the visitor in a communication such as an email.

A visitor may be associated with host who is in PACS. The visitor may be assigned rights to PACS and elevator systems. The Visitor may register at a visitor kiosk by furnishing a factor solution. The PIN may be designed to be used by the prospective visitor for only once instance, or be used more than once, at any controlled portal authorized for use by the visitor. Use of the PIN may result in a notification being sent to the host or other personnel.

The visitor may register a personal asset, like checking a mobile phone not allowed within the building. Then the host is sent email or SMS notification that visitor is on site. The host may remotely control portal to allow visitor access to controlled areas. The foregoing may be performed through the cloud, and so that the event spans more than one web-cloud hosted system and physical system device.

Example of Operation: Dynamic Threat Level

The security posture of a physical security device, physical security subsystem, or a plurality of devices and systems may be defined and adjusted at the web-cloud and communicated in real time to all affected components. Referring again to FIG. 3, for example, an operator user may, in response to a national security or emergency event, increase the security posture of all devices 90-94 within all the physical security subsystems 31-34 in his charge. The result may be that all access control devices now require two instead of one factor authentication, or surveillance cameras' frame rates are increased, or alarms be armed in a particular manner, or elevators may now require authentication, or visitor requests may be suspended and asset may no longer be checked out.

Alternatively, the trigger to modify the security posture of the entire web-cloud unified physical security subsystem 60, or physical security subsystems 31-35, may result automatically from analysis of one or more of the device data or analytic data originating from a physical security subsystem or plurality of systems. Additional examples of responses to those listed above may include adjustments to what device and controller data is analyzed, the manner in which it is analyzed (for example detection thresholds may be adjusted), and the degree to which it is analyzed (for example analysis at every step from device to web-cloud). In this manner the system 60 may adaptively, dynamically and automatically strike the optimum balance between resource consumption (e.g., processor, storage, bandwidth, etc.) and efficient operation. This adaptive security posture may apply to one physical security device, to one physical security subsystem, or scale to span a massive plurality of security devices and systems.

Example of Operation: Real Time Monitoring and Management of Alarms

An authorized user with access to a browser and an internet connection may monitor and manage any alarm node within a facility or across a plurality of facilities for which the user has rights. For example, in one embodiment the authorized user may remotely remove the alarm point from the alarm zone so the zone can be armed. The alarm point may be configured for different modes. For example, if the point is in an alarm mode, the user may remove the point permanently from the zone, and the user may enable an alarm point by returning the point to the zone so alarms will be recognized and reported. Furthermore, the user may arm the alarm zone in an away mode which will arm doors on the perimeter of the zone and within the zone, or arm the zone in a stay mode which will arm only the perimeter doors. The user may also arm instantly to activate the alarm zone without providing for the delays at the egress path doors, and finally the user may disarm any zone.

Referring once again to FIG. 3, when an alarm occurs within an armed zone, the web-cloud security subsystem 50 may notify at least one of designated individuals and groups and a monitoring center by means that include at least one of a dialer and e-mail notifications 12 and SMS notifications 13 and real time messages to a browser that can communicate with and display data exchanged via a network such as the internet.

Example of Operation: Simulated Physical Access Attempt and Virtual Commissioning By virtue of the flexible remote monitoring and control afforded by embodiments of the foregoing architecture, an authorized user may simulate a physical access attempt from a browser enabled device featuring an internet connection. For example, the authorized user may interface to the web-cloud security subsystem and command a "virtual credential ID" be sent to a specific controlled portal within a physical security subsystem that may feature an access device with an integrated controller or an access device working in tandem with a decoupled portal controller. The virtual credential ID may be directed to stimulate the access reader or the decoupled a) controller, and in this manner faithfully induce a response in the device consistent with, for example in the case of a possession based factor test, that of a card physically having been used in an access attempt. In this manner all of the traditional functionality of the controlled access point may be tested just as if the user were on site and used a card to test the portal. The virtual test may be extended to all knowledge, possession and biometric factor tests consistent with those that may be encountered at a controlled portal. The user may also monitor the status of the controlled portal to assess its response to the virtual access attempt.

For example, an authorized user may not be in possession of an authentication factor solution, and require the assistance of a guard to gain access through a controlled portal. If a security guard, for example, was to open the portal for the user, then there may be no record of whom the user was. And perhaps no record in the hosted PACS system of the access attempt. But with the method described herein, the guard can enter the virtual card ID associated with the user, and thereby ensure access is granted in compliance with prevailing PACS protocols, and also benefit from a PACS event record.

This method of virtually exercising a physical security device applies to all of the devices associated with the complete set of hosted security applications. For example, other devices and system events may be simulated in a similar manner including by way of example and not limitation a visitor event, a surveillance event, an alarm notification, an elevator destination request and an asset identification request.

The simulated access attempt may be used to diagnose a controlled portal, or simply to verify it is operating correctly. The latter is particularly helpful when testing a new installation, as every portal must be verified as operating in compliance with a prescribed standard. To further illustrate the advantages of a virtual test, the user may configure a batch test that subjects all the newly installed controlled portal to a virtual access attempt from every valid user. Responses to the test may be automatically analyzed, and detected faults presented either to the user for investigation or to further automated diagnostics. In this manner, an authorized user with access to a browser and an internet connection, whom may be located anywhere, can virtually test a single point or a plurality of controlled access points that may be proximate to one another or within widely disparate facilities.

This virtual commissioning feature implemented by embodiments of the inventive concepts may naturally also be applied to diagnose, test and control the edge devices, and their associated controllers, of the other hosted applications of surveillance, elevator management, visitor management and alarm management. Finally, virtual testing may occur in response to a manual request, for example from an authorized user, in response to an automated trigger, or be configured to run periodically or in a continuous testing mode to proactively detect or anticipate faults before they occur.

In another example, an operator user may implement embodiments of virtual commissioning to verify correct operation of a newly installed portal. The operator user may log onto the web-cloud security subsystem, and induce a valid credential ID, as per a valid cardholder, to be communicated to the physical security subsystem's device controller. The controller would receive the valid ID as if an operator user had just made a valid access attempt. The controller may log the attempt, the fact that access was granted, and may energize the portal securing mechanism to temporarily unsecure the portal. If the expected responses from the controller are not registered by the web-cloud, then an event notification may be issued. Unexpected responses may include the ID was deemed not valid for the portal or time of day or both, or the controller was unable to properly unsecure the portal. Therefore, an authorized administrator or operator user may from anywhere in the world, with an Internet enabled browser based remote monitoring and control device, test in real time aspects of any one physical security subsystem in a manner that faithfully emulates the device and controller input and responses as if a person had attempted to use the device.

This concept may be extended to include emulating a list of valid IDs, or invalid IDs, so that it may be verified in real time from anywhere that aspects of a physical security subsystem are operating correctly. Furthermore, the concept may be extended to a plurality of devices within a physical security subsystem, and to a plurality of physical security subsystems. For example, an operator user with access to several sites, with responsibility for hundreds of valid users, and several dozens of terminated users, may conduct a real time test that submits all the PACS devices across all sites to a virtual test to verify all the valid users' access IDs are correctly accepted by the devices and controllers, and all the invalid IDs are correctly rejected.

Finally, the simulated tests described herein may be conducted automatically such that the test is run periodically or in response to a trigger provided by an external event or decision.

Inventive Feature: Analytics

The web-cloud security subsystem is unique in its ability to deliver actionable analytics and situational awareness resulting from simplistic rule-based decisions as well as more sophisticated data and event fusion. The web-cloud security subsystem may make use of analytics to discover patterns in data throughout the system and across the hosted applications that would be otherwise difficult to detect or sufficiently appreciate. The system may progressively distill physical security device and sensor data from its origins at the physical security subsystem edge through to the web-cloud. Data and analysis are summarized and reported as digestible and actionable intelligence for automated or man-in-the-loop responses. The analytics may be hierarchical in nature so that fused data from widely distributed nodes may deliver the highest levels of performance, awareness and control.

Analytics systems, methods, and devices may operate on data at three levels within the system. At the physical system edge, where for example the access readers, alarm panels, elevators, surveillance sensors and visitor kiosks reside, each physical system produces data in response to each device state, event or transaction. This device data is referred to as event data. Analysis conducted proximal to devices may be intensive, such as video analytics, or intermittent such as for an access control system.

Referring once again to FIG. 2, the unique combination of the security applications of access control 80, surveillance 81, alarm 82, elevator 83, visitor management 84 and asset management 85 in a single web-cloud based system 50 provides the opportunity to quickly and easily assess the status and events of one system in the context of one or more of the others. This capability is made all the more potent by virtue of the fact that all of the hosted applications may share a common database 42, and processor 41 that may both easily and flexibly scale to almost limitless dimensions. Furthermore, a common temporal reference 40 and the intrinsic time reference of security devices may be synchronized with the web-cloud as often as is deemed practicable.

For example, a connector between surveillance device 91 and network may provide a real time event 101 generated by the surveillance device 91, which may be compared at the web cloud system 50 in nature and timing to the status of the other security devices 90-94, and other hosted applications 80-84 and in turn invoke a prescribed response. Alternatively, forensic data produced by the hosted surveillance system 81 may be compared to the forensic data produced by other systems 80-84, or a blend of real time and forensic data produced by any system or subsystem may be compared to that of other systems or subsystems. For example, a connector between an alarm panel 92 and network may provide an alarm event 102 generated by an alarm panel 92 that may induce a change in the multi-factor security tests applied to a portal device 90 controlled by the access control application 80. In a forensic mode, an investigator may wish to associate the state of each sensor and status of each analytic parameter across all hosted applications 80-84 and throughout a prescribed timeline. In this example the importance of having all device events synchronized in detail is self-evident and fundamental to the resolution to which events can be reconstructed and insights be drawn. For example, a forensic investigator may wish to review a series of "access denied" events 100 as reported by the access control application 80 in the context of nearby video events 101, alarm events 102 and the identity of visitors 94 known to be in the facility during the investigation timeline.

In related embodiments, the web-cloud security subsystem 50 may analyze data of all types including at least one of physical security device data, controller data, hosted application data and analyzed data originating from any facet of the system. The web-cloud security subsystem 50 may host a display such as a predefined "dashlet" presentation, composed of such aids as a real time graph, dial indicators, meters, counters, etc. that enables users to quickly ascertain the health, status and performance of the system or aspects of the subsystems. Alternatively, users may develop their own custom means of displaying analyzed data. For example, the relative location of devices may be presented in like form within an illustration of the areas in which they operate, where device icons may indicate the location and status of devices, and a simple hover or prod on the icon may summon up more detailed device data. Alerts and alarms generated by individual devices, or as a result of fusing a plurality of device data, may be automatically analyzed and presented so as to enhance the users' view into the origin of the events leading up to the alert and assist users in shaping or verifying the appropriate response.

Particular value is yielded by analysis of device and component data throughout a temporal range, or by data spanning a plurality of devices and components that may in turn span a plurality of physical security subsystems 31-34 and related locations. Disparate device data and event data may be correlated, associated and fused into a mosaic revealing a wider context of events, or fused together to provide a more penetrating in-depth view of events.

In this manner it is possible to detect events, patterns and anomalies within vast volumes of disparate data not otherwise possible. For example, usage patterns of controlled portals may help determine the right level of staffing of security personnel and other support departments. Occupancy estimates, distribution of occupants and identity of occupants may become invaluable in responding to a safety or security event.

Furthermore, the integrity of the reported events that satisfy alert and alarm criteria may be improved by viewing data of one source in the context of the other. In this manner false alarms may be reduced and valid detections made more robust. For example, a PACS system may indicate that an area is not occupied, but a proximate motion detector of an alarm system may reliably indicate somebody is in fact within the area, possibly without authorization.

In yet another example, a spike in the frequency of "access denied" events from a PACS system may indicate a nefarious attempt to breech a controlled area. Analysis of the PACS IDs that were rejected and the location of the portals involved may yield insights on the likelihood of unauthorized access attempts. Furthermore, analysis of these events over longer time periods may reveal more subtle probing attempts. Tying the PACS analysis with surveillance data may yield video footage of the personnel involved and a context to the event chain.

Figure 8:
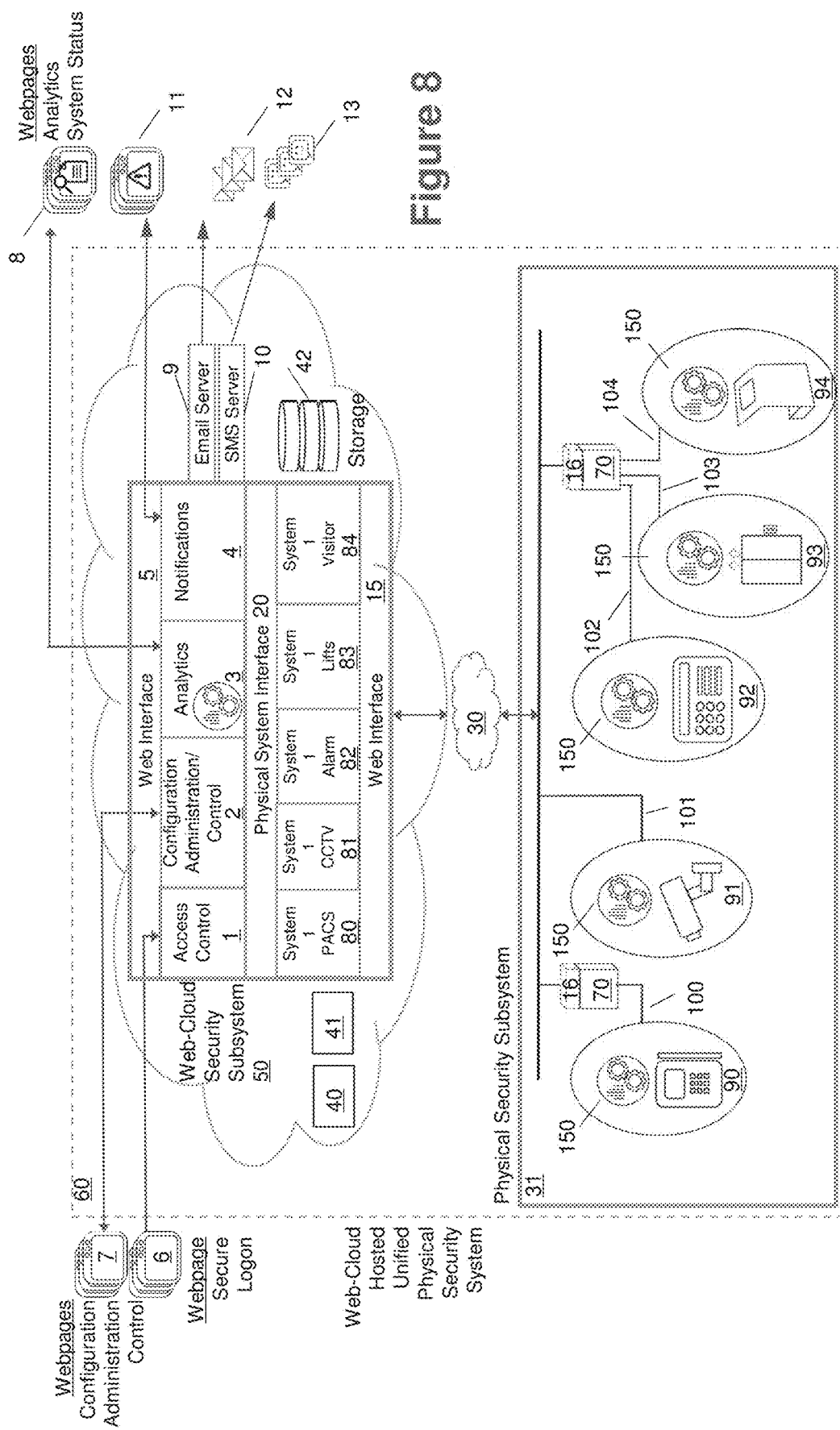
FIG. 8 illustrates analytics in a web-cloud security subsystem and physical security subsystem devices, in accordance with some embodiments.

Access Control Reporting and Analytics
Physical Security Devices with Integral Analytics Referring to FIG. 8, each security device 90-94 may include an onboard analytics device 150 that analyzes the security device event data 100-104 produced from one or more edge devices 90-94 and as a result of analysis may either add to the event data in a way that adds value, or reduces the volume of event data to relax the subsequent requirements on bandwidth, storage and processing. Device data that may now include analytic data 100-104 is communicated from the edge devices 90-94 to the web-cloud security subsystem 50 where it may be further combined with cloud based system analytics 3.

Physical Security Device Controllers with Integral Analytics

Referring to FIG. 9, if an intermediate device, for example a device controller 70, is used between the security device 90-94 and the web-cloud 50, then analytics 160 may reside at, and be generated at, the controller 70. Event data 100-104 from each security device 90-94 supported by the controller 70 may therefore be analyzed to improve, qualify or curtail the event data stream 100-104 passed from the controller 70 featuring analytics 160 on to the cloud based system 50.

Hosted Security Applications Integral Analytics

Figure 10:
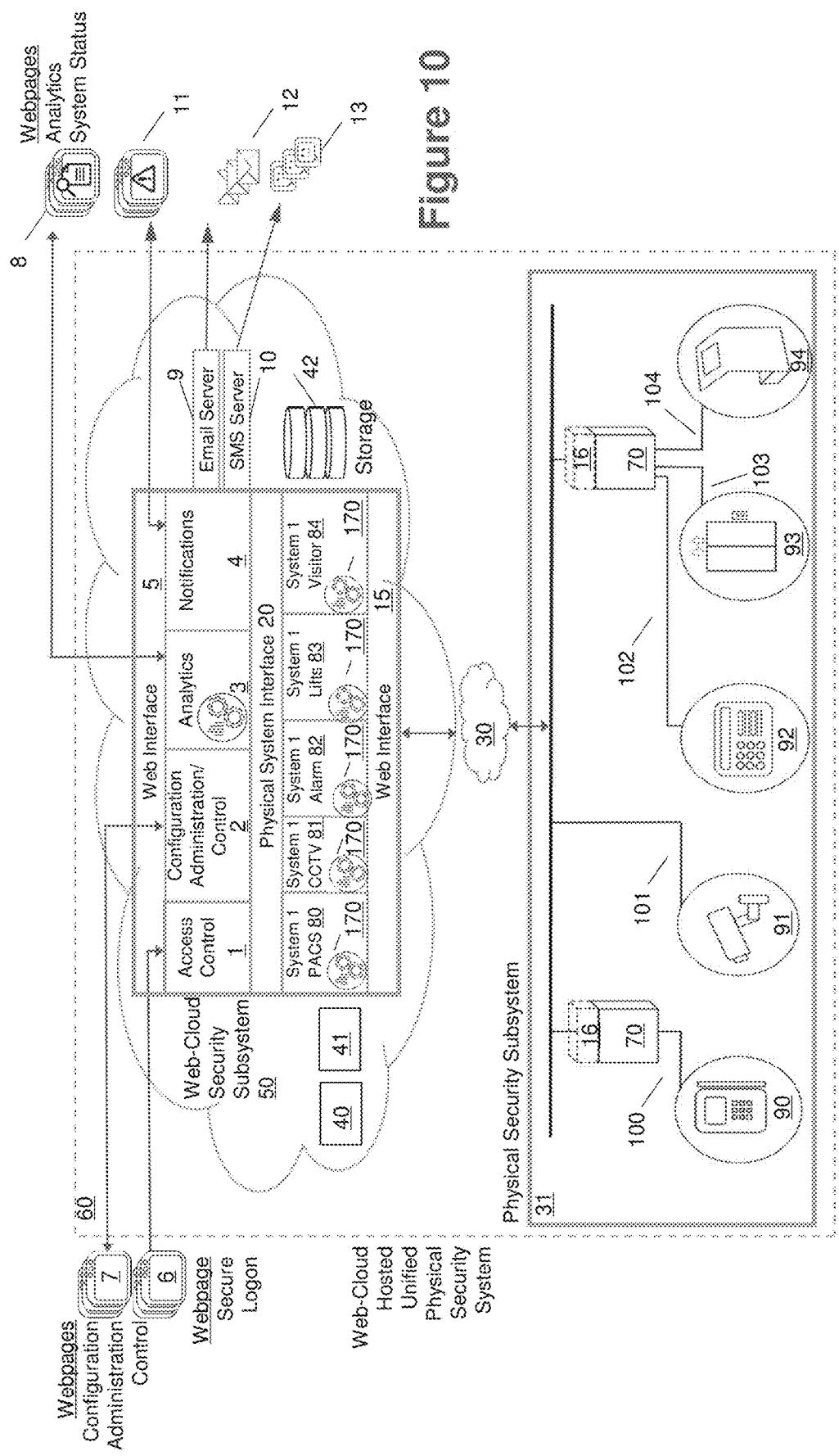
FIG. 10 illustrates analytics within web-cloud security subsystem management and hosted applications, in accordance with some embodiments.

Referring to FIG. 10, web-cloud 50 hosted applications 80-84 may also feature analytics 170. For each hosted application 80-84, a dedicated analytics module 170 may analyze the data originating from each associated physical security device at the "edge" of the system 90-94. The result of the web-cloud hosted application analytics 170 is to glean as much insight as possible from each hosted application's operation. A system level analytics module 3 residing in the web-cloud may be used to analyze data from each hosted application 80-84 that may include raw sensor and event data 100-104 and application specific analyzed data resulting from hosted application analytics 170.

Finally, non-analyzed device and event data 100-104, analyzed data from a hosted application and the results of analyzed data across hosted applications may be used to create commands or adjustments that may be passed back from the web-cloud security subsystem to at least one of the intermediate controller 70 and security devices 90-94 to improve the efficacy of analysis at each level or adjust the operational characteristics of a device or physical security subsystem 31.

The analytics module 170 for each hosted application 80-84 within the web-cloud security subsystem 50 may collect, fuse, store and analyze real time and forensic data types pertaining to each hosted application 80-84 so that application specific data trends and patterns may be revealed and automatically detected, thereby enabling the system to report conditions that meet prescribed or anomalous definitions. Furthermore, the overarching web-cloud security subsystem analytics module 3 may automatically fuse or correlate data and events originating from at least two of the hosted applications, or temporal data and events from at least one hosted application, thereby enabling detection of data patterns and trends across hosted applications or back through time for any one or more applications.

Pervasive Analytics

Figure 11:
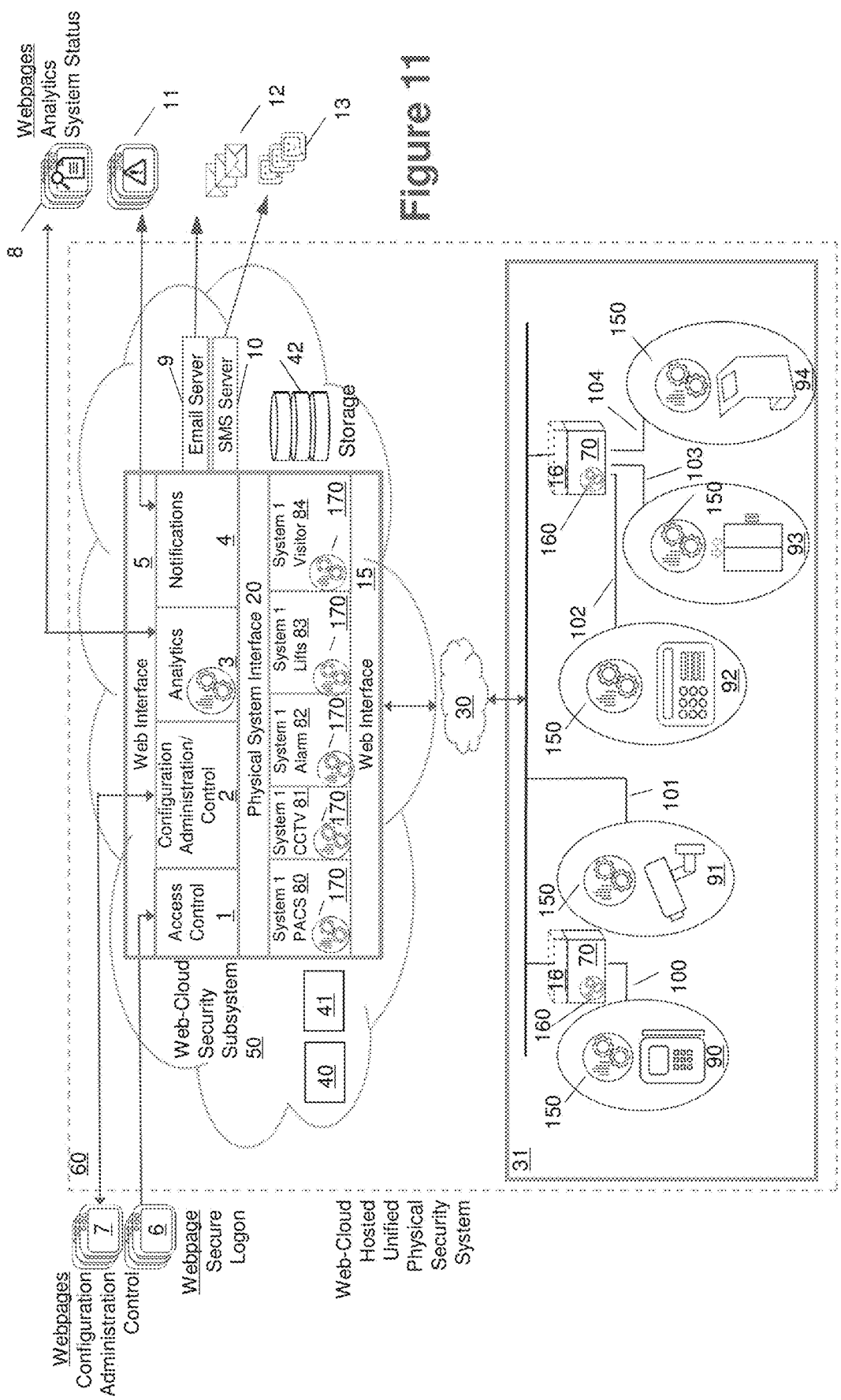
FIG. 11 illustrates pervasive analytics, in accordance with some embodiments.

By way of example, referring to FIG. 11, video data may be analyzed locally at the surveillance camera 91 by onboard analytics 150. The camera data stream 101 may include surveillance analytics data along with other surveillance event data. This device data 101 may be passed to the intermediate controller 70 where it is further analyzed by integral analytics 160. The resulting data may be further analyzed in the web-cloud security subsystem 50 by the hosted surveillance application 81 application analytics 170. Furthermore, the data streams and analytic results across the hosted applications may be further analyzed by the web-cloud based system analytics 3. In this manner the surveillance data is progressively analyzed and qualified to both facilitate efficient communications to the web-cloud and to clarify the insights that can be gleaned from the data from within the web-cloud. In response the web-cloud based system may compute adjustments to the parameters of at least one of the analysis that occurs at the cloud application layer and analysis at intermediate layer and the onboard surveillance camera analytics, and communicate these adjustments to one, some or each layer of the analysis, which may include the onboard analytics 150, integral analytics 160 application analytics 170 and system level analytics module 3.

Example of Operation: Situational Awareness

Analytics pervasive throughout the system 60 from the security devices, sensors, and controllers to the web-cloud security subsystem may be used to improve situational awareness to provide for robust and accurate alerts to predefined conditions and may be harnessed to create new alert conditions. The analytics may furnish the authorized user with an integrated cross-application situational summary, using textual and graphical descriptors of events in the designated area of interest and at the requested level of detail. The analytics may support at least one of physical security subsystem situational awareness reports and hosted cross-application real-time situational awareness details and simple descriptive text and visualizations.

In one embodiment, the user may request system conditions that may include data analyzed through a rule-based decision process employing at least one of plain text rules and preferably Bayesian inference. Directed actions may range from unlocking an access portal, to generating and delivering a status report, to new person enrollment, to system re-configuration.

Example of Operation: Virtual Muster

Generating an accurate estimate of the number of people within a facility during normal operations can benefit operational efficiency programs, policies and Building Automated Systems (BAS). In the event of a safety or security emergency, knowing exactly how many people remain within an area, and even identifying who they are, can be critical to help ensure a complete evacuation of non-responders and non-authorized personnel.

Virtual mustering refers to the process of gathering, covening, assembling etc. people for the purposes of inspection or roll call, or "counting heads". In some embodiments, a web-cloud hosted unified security system 60, for example, illustrated at FIG. 12, achieves this result by analyzing system data. For example, this may apply in a facility where the automated result of how many people are within an area, referred to as an occupancy estimate.

Figure 12:
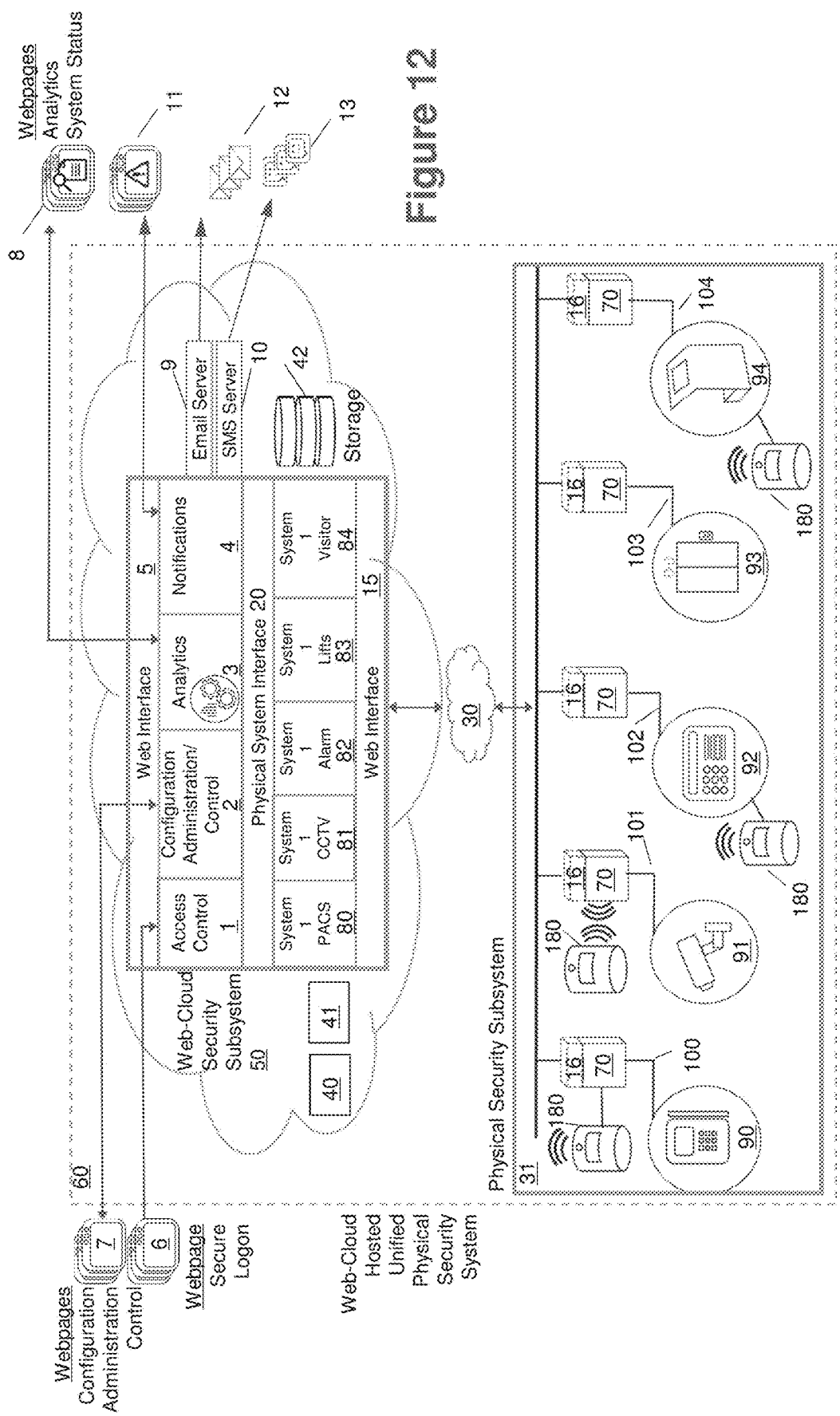
FIG. 12 illustrates a system for virtual mustering, in accordance with some embodiments.

Referring to FIG. 12, the system 60 in accordance with some embodiments of this invention may make use of one or more sensors 180 to detect the presence of an occupant, and security device data 100-104 to register the presence of an occupant and in some cases identify the occupant. It will be noted that FIG. 12 illustrates the possible configuration of a dedicated controller 70 for each device. Sensors 180 may be placed throughout a facility and communicate with local controllers 70 via wired or wireless links. Furthermore, sensors may be embedded in security devices including by way of example at least one of visitor management kiosk 94, access control reader 90, surveillance sensor 91, alarm panel 92, elevator car 93, an elevator call panel 93 and an asset tag reading station 95.

Sensors 180 may take the form of motion detectors, video sensors, audio sensors, thermal sensors, mobile device Personal Area Network (PAN) and WiFi sensors, etc. Sensor data may take the form of triggers from simple motion detectors, metadata from audio and video surveillance analytics, and data intrinsic to security devices 100-104. Data of all types that may indicate the presence of an occupant is collected from each sensor point 180 and forwarded to the web-cloud security subsystem 50 where it is aggregated and analyzed by occupant estimate analytics residing with the web-cloud analytics 3. In this manner, an estimate of the number of occupants for a given area can be computed, and occupancy estimates of a plurality of areas can be combined for multi-area, site-wide and multi-site estimates.

Sensors that furnish identification data are of particular value. For example, a sensor that detect the Bluetooth™ network of a user's phone or the WiFi network of a user's personal computing device may help identify the user as an occupant whom should have already vacated or a first responder who is authorized to be in the facility. If an identifier is detected leaving the main entrance or exit portal for a controlled area or the entire site during an emergency, then it may be determined that an occupant of known identity has safely egressed.

Signals, messages, notifications, etc. resulting from the occupancy analytics module 3 can be sent from the web-cloud security subsystem 50 to communicate with all compatible devices within the facility and beyond. For example the web-cloud security subsystem may send an SMS 13 over a mobile phone link, an email 12 over a mobile phone data or WiFi link, or serve a webpage 11 to a browser enabled device via an internet connection 30, that warns all device holders within an area or site to safely and quickly leave the area or site. This communication may include guidance or instruction for how to best accomplish a safe and expedient egress. Furthermore, knowledge of occupant identification and location may be used to direct first responders and authorized occupants towards non-authorized occupants, and vice versa.

Authentication Trust in the Cloud

Figure 13:
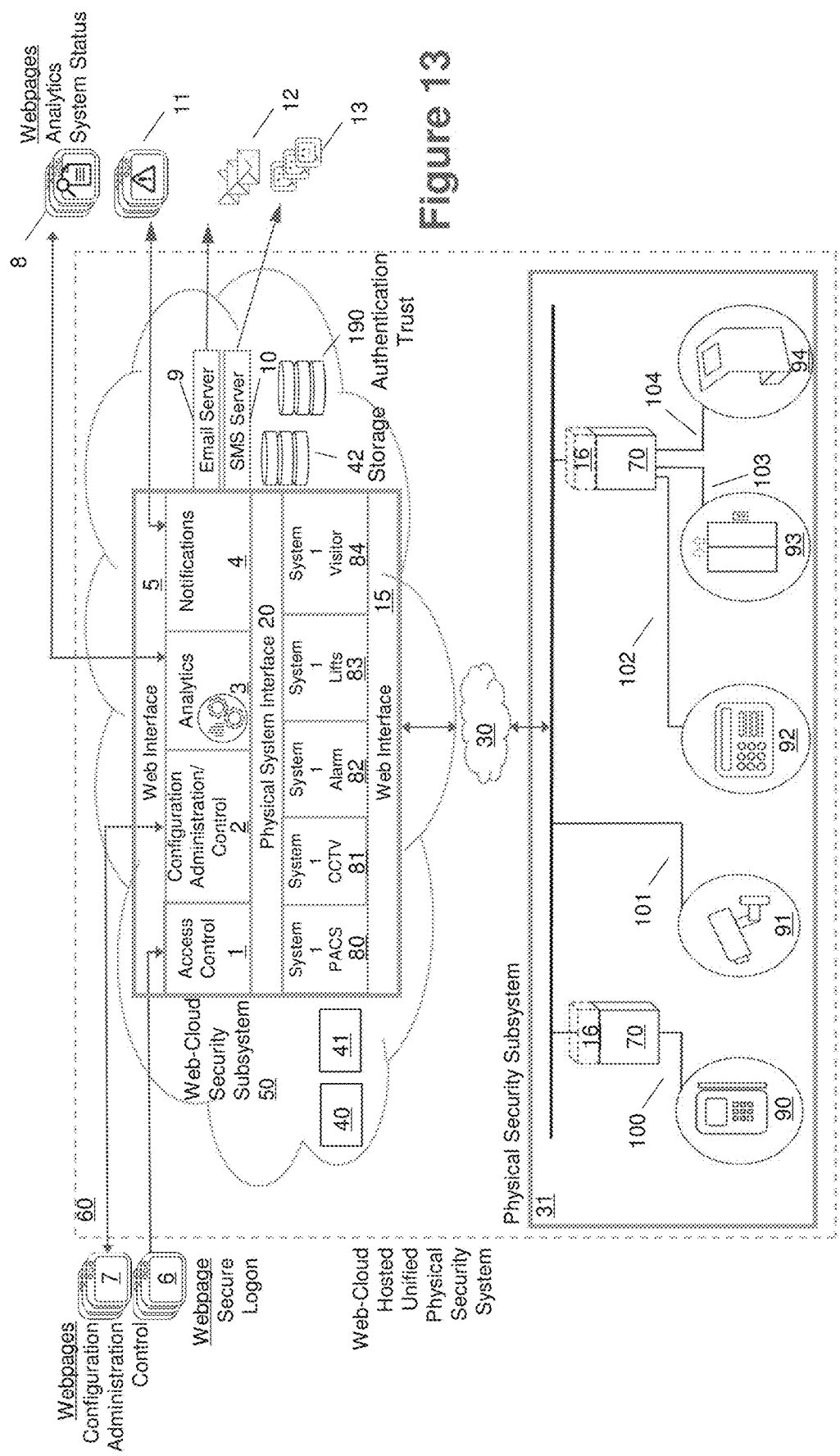
FIG. 13 illustrates a system for web-cloud security subsystem authentication trust, in accordance with some embodiments.

Referring to FIG. 13, authentication technology may reside on a number of devices, from mobile devices used to interface with the web-cloud 50, to access control readers 90, to visitor kiosks 94, etc. Each authentication device may send authentication data (including biometric) to the web-cloud 50 which may serve as authentication data comparator and repository. An authorized user whom has successfully satisfied two or more of the authentication tests, may subsequently access the web-cloud with one authentication factor and have the other available for alternative or two factor authentication.

Users may remotely authenticate themselves in order to access the web-cloud based system. This authentication may include at least one of a knowledge based test, a possession based test and a biometric test. Referring to FIG. 13 shows the web-cloud security subsystem 50 may feature an authentication trust 190 which provides the means to store, compare and manage user authentication data. Furthermore, the web-cloud based system may communicate with other authentication systems and databases to exchange, compare and validate authentication data.

Visitor Management

The web-cloud security subsystem facilitates secure visitor management. The process consists of a visitor pre-authorization, a verification that the visitor should not be denied access, a visitor identification verification, and finally visitor admittance.

Visitor pre-authorization is instantiated by an authorized user whom has authenticated himself to the web-cloud security subsystem and requests a visitor access event on behalf of a designated host. This request may be for one visitor, a plurality of visitors, or a specific group or class of visitors. Visitor access rights, visit recurrence and duration of rights may also be initially defined during pre-authorization.

For each individual visitor for whom temporary access has been requested, a comparison may be made with known individuals who are not to be granted access such as former employees, representatives of competitors, known criminals, etc. In this manner a safeguard is in place to ensure that unwanted individuals are not granted a visitor status and therefore may not enter a controlled facility based solely on the rights afforded by an issued visitor's credential. In the event an unauthorized visit is attempted the web-cloud security subsystem may in response notify designated personnel via an email or SMS alert or alarm.

If there is no reason to not admit the prospective visitor, the prospective visitor may be furnished with at least one of the multi-factor test solutions and directed to log onto the web-cloud based system using at least one of the multi-factor test solutions to complete the visitor access request. This process may collect additional information on the prospective visitor including biometric data. Alternatively, the authorized user whom has instantiated the visitor request may enter in the visitor's data. The process culminates with issuing the prospective visitor with at least one of a multi-factor test solution that will be valid at the location, during the timeframe and with the prescribed access rights as defined by the host during the pre-authorization step.

In one embodiment, when the prospective visitor enters the facility he may be required to authenticate himself with at least one of the issued multi-factor test solutions. For example, the visitor may approach a visitor kiosk where he will enter a PIN relayed to the visitor during pre-registration. Or the visitor may present his mobile phone displaying a 2D barcode or other unique identifier to the kiosk's camera, or a biometric signal may be provided by a biometric device. In general, the visitor will present at least one of the three factor authentication solutions that correspond to the authentical test(s) of the pre-registration step. Upon a successful test result the prospective visitor, now authorized visitor, may be issued a credential that identifies the visitor as such, and whereas the credential may facilitate access to controlled areas, elevators, etc. by at least one of visual and electronic means. The visual format of the credential may for example make is easy to recognize the nature of the visitor, assigned access rights, duration the rights are valid and the identity of the host. The access credential may also serve to support recording and tracking of the visitor's current and historical whereabouts. For example, a prospective visitor may approach a kiosk in the lobby of the facility being visited. The kiosk may prompt the user for a PIN and a conduct a biometric comparison. If both factor tests are successful, then the kiosk may issue the prospective visitor, now temporary visitor, a credential such as a photo badge to be displayed at all times during the visit. Furthermore, the credential may also support electronic access control authentication.

In another embodiment, when the prospective visitor arrives at the time and location specified during the pre-authorization step, the visitor may be remotely granted access through a controlled portal by an authorized user currently logged onto the web-cloud based system. For example, the visitor may approach an access controlled portal, enter a PIN, and in response the host may receive a notification that the visitor is present at a particular portal, and in response the host may remotely unsecure the portal to permit visitor access. This notification received by the host may be at least one of an email and SMS message and a webpage.

In yet another embodiment, the pre-registration step may be completed on site by an authorized user, such as a security guard, to issue a visitation credential and associated rights to visitors who arrive without prior notification, registration or authorization. In this embodiment, the authorized user may make use of the prospective visitor's existing credentials, such as driver's license or credit card, to scan the credential as a way of expediting collection and entry of the prospective user's demographic data.

In yet another embodiment, vehicles may be pre-registered and subsequently authorized in much the same protocol, where images of the vehicle and vehicle's license plate may be captured during pre-registration, associated with the host, and subsequently used during a visit access request.

In all embodiments described herein, upon entering or exiting the host facility, the s visiting person or vehicle may be required to at least one of present a credential and submit to an automated biometric test and submit to an automated license plate recognition test.

The visitor management application residing in the web-cloud security subsystem may analyze events and data pertaining to visitor pre-authorization, authorization and subsequent visitor metadata produced by the physical security subsystem devices. The visitor data analysis may result in reports and insights on at least one of visitor access events including location and time of day, visitor group movements, peak visitor traffic statistics, recurring visitor statistics, and anomalous and otherwise unusual visitor activity.

Watch-List

Physical security systems in use from multi-site enterprises operations to single tenant residences must contend with a fluid and ever-changing disposition of employees, visitors, vendors, contractors, tenants, etc. The continuously changing nature of these authorized user segments poses a challenge for effectively scrutinizing each newly authorized user, and ensuring that new and existing users across all segments are not in fact known to pose a threat to the authorizing entity. Therefore, a means is sought to verify that new and existing users, of any user type, may be verified as posing no known threat to an enterprise, building, controlled area or its occupants.

The web-cloud security subsystem may feature watch-lists of known persons who have been determined to pose a sufficient threat so as to not be permitted access to some or all of the physical security subsystems. The source of threat determination may be national, state or local law enforcement, or the threat may be determined civilly or personally by authorized users. Watch-lists entries may for example span the threat spectrum from international terrorists, to wanted criminals, to persons with an active restraining order against a current employee, to former employees.

The watch-lists will be managed and accessed in accordance with the access rights and privileges of authorized users. For example one watch-list may be maintained by the web-cloud security system administrator user so that it may be available to all users who wish to avail themselves. Other watch-lists may be created and maintained by authorized users at all levels from multi-site enterprises to a single tenant apartment. For example, an operator user with responsibility for a multi-site enterprise, comprising a plurality of physical security subsystems, may maintain an enterprise wide watch-list that applies across all sites. Alternatively, an operator user of a multi-tenant building may maintain a watch-list applicable only to the one building.

Watch lists may be coordinated by grouping more than one list together. For example, an international multi-site user may wish to ensure that both terrorists and former employees are not granted visitor access and therefore make use of the web-cloud security system watch-list, corporate watch-list and potentially other watch-lists.

Watch-list entries may include the threat's name, date of birth, known aliases, address, citizenship, demographic data, biometric data such as a face photo or fingerprint, and an assessment and nature of the risk posed. When a specific watch-list is appended with a new threat entry, a comparison may also be made to members of other watch-lists within the web-cloud security subsystem to determine if the threat is already known in some context. In this manner it can determined if a historical relationship exists, and for example ensure the watch-list entry has not previously made discreet attempts to access controlled areas.

Likewise, when a new authorized user, new visitor, new vendor, etc. of any type is added to the system, the user's identity may be compared to one or more watch-list identities thereby providing an additional layer of security in preventing known threats from accessing controlled areas. Non-real time identification comparisons may be conducted in response to the administrative addition of a new employee, new visitor, new vendor, etc. that precede an access attempt, and real time identification comparisons may be made in response to an access requests, or visitor or vendor arrival, etc. Finally, comparisons may also be conducted among the identities of threats across segregated watch-lists. Therefore, a manual or automated request may induce a watch-list comparison; such as a change to or addition of an authorized user record or a preregistration of a prospective visitor may induce a comparison of that user or other user with one or more of the watch-lists. Likewise, for example, a change to one or more of the watch-lists may induce a comparison with one or more of the user lists, and user lists and watch-lists may be compared amongst themselves.

The results of comparison matches or non-matches to one or more of the watch-lists may induce an automatic or manual notification via SMS, email, webpage, or other electronic communication that may include the watchlist record details.

It will be appreciated that the inventive concept of a web-cloud hosted watch-list is applicable across all of the hosted security applications. For example, physical access may be denied to a watch-list member by PACS and elevator systems, video surveillance analytics may be used to identify or track a watch-list member, and the visitor management system may aid in screening for watch-list members in seemingly innocuous visitor arrivals.

The nature of detecting watch-list members may include simple demographic data matching. For example, the name, date of birth, known aliases, known distinct markings, etc. that describe a watch-list member may be compared to those of existing and prospective employees, visitors and vendors. Furthermore, more accurate comparisons may be made using biometric data. For example, a face photo or fingerprint of a watch-list member may be efficiently and accurately compared to employees, visitors, etc.

The watch-list functions described herein make use of the web-cloud security subsystem processor, storage, software and analysis components, and physical security subsystem device data. Watch-list search and comparison results may be conveyed to authorized users via webpage, email or SMS. Authorized users may review alerts, alarms, data and imagery on a real time monitoring and control device such as an internet enabled device featuring a browser, for example, an internet browser or the like that permits access and viewing of web pages and so on.

The method by which the system analyzes text based identifiers of authorized users, prospective users, and watch-list members is unique. The system creates a super set of descriptors for each identity to be searched or compared so that a much more thorough matching may be achieved between records that describe duplicate users in different terms. For example, nicknames may be automatically created and temporarily assigned to a user record, likewise recorded nicknames may induce a set of Christian or family names to be appended to a record. Christian names and sir names may be expanded by variations on spelling, and the order of Christian names and sir names may be interchanged.

In this manner user records may be expanded so that subsequent searches within and across user and watch-list groups may be conducted such that the original and expanded record data set may be compared. Matching criteria may include exact field matches, partial matches, and close matches as determined by more sophisticated means such as maximum likelihood and Bayesian matching techniques. This technique is particularly effective when dealing with sparse data, incomplete data and incorrect data.

A known concept of IFTTT (If This Then That) relies on the ability to programmatically determine if something has happened and then to programmatically do something in response. This capability may exist at either the web-cloud security subsystem, the physical security subsystem, or both. Communication of data may be exchanged between the web-cloud and physical security systems, between two or more physical security systems directly, be shared with a browser device or any combination thereof. Following the analysis of data exchanged in accordance with the IFTTT prescribed logic, in accordance with some embodiments, action taken as a result may occur within the web-cloud 50, at the physical security system 31, some other interface device (mobile phone) or any combination thereof. Data conveyed may be simple binary state data or sophisticated metadata. Actions may include, by means of example and not limitation, inducing a record of the logical result in the web-cloud 50, changing the state, status or in some way impacting the operation of a device within the physical security system 31 and producing a notification that includes at least one of the logic result, the logic definition, the elements that contributed to the result and the values of each element.

The end-user may configure the conditions that they want to use to trigger an action. The trigger may include but is not limited to any of the events that are collected from the physical security subsystems, other users' activities within the web-cloud subsystem, and conditions that are triggered by the analytics modules distributed throughout both the web-cloud subsystem and the physical security subsystems.

In response to the triggers, actions that can be configured may include but are not limited to sending out notifications (via email, SMS and other methods), popping up on-screen notifications to system operators, configuration changes to the behavior of both the web-cloud subsystem and the physical security subsystems, and state changes to the physical security subsystems. For example, a system operator manually releasing a door more than 10 times within a 5 minute period might trigger the sending of a notification to building management and remove the operator's ability to release that door again until the building manager reinstates his ability to do so.

Rules or triggers can be controlled by a schedule and may have an active start and/or stop date that control when the rule will be valid.

End-users can build more complex rules that test the occurrence of one or more simpler rules to make more sophisticated trigger conditions. These complex rules will allow for multiple triggering events, counting of events to allow for thresholds, and time constraints to enable correlating events based on proximity of time. By correlating events from different physical security subsystem components into a single rule or chain of rules, we are able to set up conditions that were previously impossible. For example, we can combine conditions from the PACS system with conditions from the Alarm System and the Vide Management System to trigger a single action.

Complex rules can also act as inputs or tests to another complex rule. Even when a simple rule or a complex rule employ an action (such as sending an email) on their own, they can still act as an input to a complex rule.

In some embodiments, IFTTT rules can trigger actions across multiple disparate physical security subsystems and can therefore enact behaviors in systems that would normally have no way of communicating directly with one another.

For example, a state university system might receive a bomb-threat on the phone. An IFTTT rule could exist that triggers off of a panic-button in the physical security subsystem where the phone call was received. The action could be to change all other physical security subsystems across the university system (all other campuses) to go into a different threat-level state or to require dual factor authentication for all dormitory buildings.

Other examples may include one or more of the following:

Simple rules chaining together to a complex rule:
For example, a simple rule might be "Rule 1: If John Smith accesses the smoking door, then send a notification to his manager". A complex rule might be "Rule 2: If Rule 1 occurs 3 times within 1 hour, send a notification to his manager and human resources". This is complex because each time Rule 1 occurs, it is logged, and the complex rule is adding both a counting mechanism and a time threshold to test the count within. Another complex rule might be "Rule 3: If Rule 2 occurs 3 times within 1 day, then remove John Smith's access to the smoking door"

Correlating Uncorrelated Events:
Simple rule: "Rule 4: If nobody has swiped their card to gain access to the machine room between midnight and 6 am, then reduce the temperature to 55 degrees"
Simple rule: "Rule 5: If the infrared motion detector in the machine room detects people, then turn on the lights"
Complex rule: "Rule 6: If Rule 4 and Rule 5 occur between 2 am and 6 am, then popup a notification on the security operator's screen" This is complex because it correlates two otherwise-uncorrelated events that occurred in two different physical security subsystem components (the PACS system and the Alarm system) and takes a single action based on their occurrence within a given time of day.

Rules may be defined using an intuitive simple language as illustrated above, and then converted to IFTTT language. Rules may be typed as test, or icons selected and concatenated to define the IFTTT logic in fast and user friendly fashion.

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, radio frequency, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

While concepts have been shown and described with reference to specific preferred embodiments, it should be understood by those skilled in the art that various changes in form and detail may be made therein without departing from the spirit and scope as defined by the following claims.

What is claimed is:

1. A system, comprising:
   a web-cloud security subsystem that hosts, manages, controls, analyzes, and autonomously responds to data related to a plurality of hosted applications stored in a web cloud—that provide at least one of physical access control, surveillance, alarm management, intrusion management, visitor management, vendor management, incident management, biometric identity, credential management, and elevator management;
   a plurality of physical security subsystems external to the web cloud and that each exchanges data with a corresponding hosted security cloud application of the plurality of hosted security cloud applications of the web-cloud security subsystem through a unique communication path, wherein the applications exchange data in a sequence from the physical security subsystems to the web-cloud security subsystems that includes a first data having a first priority prior to a second data having a second priority even though the sequence is out-of-order such that the first data occurred after the second data, including in response to an interruption in the data exchange;
   a real-time control and monitoring device that provides a secure, communication with the web-cloud security subsystem, for accessing, viewing, analyzing, and controlling aspects of the entire system, including a combination of resources, industrial, logical, identity, access, and permission data; and
   a temporal reference device that synchronizes with a common clock to provide a temporal reference that is shared by the hosted security cloud applications as a common web-cloud temporal reference.

2. The system of claim 1 wherein the physical security subsystem and web-cloud security subsystem are at least one of monitored and controlled and actuated in real time by the real-time control and monitoring device.

3. The system of claim 1 wherein the web-cloud security subsystem unifies the hosted security cloud applications and is accessed through a single browser interface.

4. The system of claim 1 wherein the web-cloud security subsystem notifies users of at least one of alarms and alerts via at least one of email, short message service (SMS), audio, and webpage electronic communications.

5. The system of claim 1 wherein the web-cloud hosted applications share a common web-cloud database.

6. The system of claim 1, wherein a web-cloud component resides in a hosted cloud and communicates with at least one of the device controller of the physical security subsystem or a device controlled by the device controller via at least one of an internet connection and a wireless connection and a cellular connection and a hardwire LAN connection.

7. The system of claim 1 wherein a web-cloud component resides in an onsite server and communicates with the at least one of the physical security controller and device via at least one of an internet connection and a wireless connection and a cellular connection and a hardwire LAN connection.

8. The system of claim 1 wherein a hosted application of the web-cloud subsystem that provides the visitor management that includes an asset management application that at least one of detects and tracks and records and reports on the at least one of presence and location and status of mobile assets.

9. The system of claim 1 wherein an input is generated that simulates a physical security device or controller input of the at least one physical security subsystem in such a manner as to emulate a physical input to said physical device or controller.

10. The system of claim 1 wherein a physical security device, in response to being virtually simulated by the web-cloud security subsystem, produces the same response as would have been produced by a physical interaction.

11. The system of claim 1 wherein a physical security device or a plurality of devices are simulated in at least one of a manual, periodic, aperiodic, intermittent or continuous manner to assess a compliant operation related to the at least one physical security subsystem.

12. The system of claim 1 wherein the at least one physical security subsystem comprises a plurality of security devices, each corresponding to at least one of the hosted cloud applications.

13. The system of claim 1, wherein the system provides a set of permissions that may span the entire web-cloud and physical security subsystems, or be restricted to limited aspects of the systems.

14. The system of claim 1 further comprising a device controller in at least one of the physical security device and the web-cloud security subsystem.

15. A system comprising:
a physical security subsystem external to a web cloud, comprising:
at least one of a physical security device and a device controller;
a web-cloud security subsystem; wherein data is produced by the at least one physical security subsystem and the web-cloud security subsystem, wherein the web-cloud security subsystem includes a temporal reference device that synchronizes with a common clock to provide a temporal reference that is used as a common web-cloud temporal reference throughout the system, and wherein the web-cloud security subsystem stores the data in the web cloud, wherein applications exchange data in a sequence from the physical security subsystems to the web-cloud security subsystems that includes a first data having a first priority prior to a second data having a second priority even though the sequence is out-of-order such that the first data occurred after the second data, including in response to an interruption in the data exchange; and
at least one real-time control and monitoring device that provides a real-time, secure, bi-directional communication with the web-cloud security subsystem, for accessing, viewing, analyzing, and controlling aspects of the entire system, including a combination of resources, industrial, logical, identity, access, and permission data; and
analytics reside within at least one of the physical security device and device controller and the web-cloud security subsystem and analyze at least one of physical security device data and device controller data and web-cloud data.

16. The system of claim 15 wherein the data produced from at least one physical security device, is analyzed by at least one of onboard device analytics, device controller analytics, cloud based application analytics and cloud based system analytics.

17. The system of claim 15 wherein physical security device data and analyzed data are passed from the cloud based system to at least one of a device controller and the physical security device.

18. The system of claim 15 wherein the data exchanged within or between the physical security subsystem and web-cloud security subsystem is analyzed and a result of analysis induces at least one of a notification from the web-cloud security subsystem and the at least one physical security subsystem.

19. The system of claim 15 wherein the data exchanged within or between the physical security subsystem and web-cloud security subsystem is analyzed and result of analysis induces at least one of a change of state in the web-cloud security subsystem and at least one component of the at least one physical security subsystem.

20. The system of claim 15 wherein a configuration of at least one of the hosted applications and physical security device controllers and physical security device and physical security sensor is determined as a result of analyzed data.

21. The system of claim 15, wherein analytics residing within at least one of an physical security device and a physical security device controller and the hosted web-cloud detects when a system component is at least one of not operating within specification and is operating anomalously and is operating intermittently and in response at least one of generates an alert and generates a corrective action and generates a prediction of future performance.

22. A system for analyzing data for virtual mustering, comprising:
a physical security subsystem, comprising:
a sensor for detecting an occupant;
a plurality of physical security subsystems external to a web cloud and that communicates with the sensor to register the presence of the occupant;
a web-cloud security subsystem that receives data collected from the sensor, and includes occupancy estimate analytics that analyzes the data to compute an occupancy result, wherein the web-cloud security subsystem includes a temporal reference device that synchronizes with a common clock to provide a temporal reference that is used as a common web-cloud temporal reference throughout the system, the web-cloud security subsystem analyzing the data related to a plurality of hosted security cloud applications stored in the web cloud, each physical security subsystem exchanging data with a hosted security cloud application through a unique communication path, wherein the applications exchange data in a sequence from the physical security subsystems to the web-cloud security subsystems that includes a first data having a first priority prior to a second data having a second priority even though the sequence is out-of-order such that the first data occurred after the second data, including in response to an interruption in the data exchange; and
at least one real-time control and monitoring device that provides a real-time, secure, bi-directional communication with the web-cloud security subsystem, for accessing, viewing, analyzing, and controlling aspects of the entire system, including a combination of resources, industrial, logical, identity, access, and permission data.

23. A system, comprising:
a web-cloud security subsystem internal to a web cloud that hosts, manages, and analyzes data related to applications of at least one of physical access control, surveillance, alarm management, intrusion management, visitor management, vendor management, incident management, biometric identity, credential management, and elevator management, the web-cloud security subsystem including a plurality of hosted applications, including a temporal reference device that synchronizes with a common clock to provide a temporal reference that is shared by the hosted applications as a common web-cloud temporal reference;
at least one physical security subsystem external to the web cloud that exchanges data with a corresponding hosted application of the web-cloud security subsystem through a unique communication path, and including a plurality of physical security devices each constructed and arranged to communicate with a hosted application, wherein the web-cloud security subsystem comprises a detection system that automatically detects the presence of newly added physical security devices and configures the new devices in accordance with prescribed protocols, wherein the applications exchange data in a sequence from the physical security subsystems to the web-cloud security subsystems that includes a first data having a first priority prior to a second data having a second priority even though the sequence is out-of-order such that the first data occurred after the second data, including in response to an interruption in the data exchange; and
at least one real-time control and monitoring device that provides real-time, secure, bi-directional communication with the web-cloud security subsystem, for accessing, viewing, analyzing, and controlling aspects of the entire system, including a combination of resources, industrial, logical, identity, access, and permission data.

24. The system of claim 1, wherein the web-cloud security subsystem hosts, manages, and analyzes a watch-list application of the hosted applications stored in a web cloud, wherein the system includes an analytics system, and wherein the watch-list application communicates with the analytics system to activate surveillance analytics for identifying or tracking a watch-list member.

25. The system of claim 24, wherein the analytics system analyzes identifiers of watch-list members by generating a set of descriptors for each identity to be searched for performing a comparison between stored user records of watch-list members.

26. The system of claim 1, further comprising a plurality of sensors for collecting presence data for a virtual mustering application of the hosted applications, wherein the presence data is output to an analytics system of the web-cloud security subsystem, where it is aggregated and analyzed to compute an occupancy estimate.

27. The system of claim 1, wherein the real-time control and monitoring device further comprises a virtual controller that executes network virtualization processes for monitoring and controlling a portal absent an external controller.

28. The system of claim 1, wherein the real-time control and monitoring device further comprises a security device controller that exchanges commands with local devices of the physical security subsystem that extend the web cloud.

29. The system of claim 1, further comprising a virtual identity credential and feedback that is exchanged via a data path determined by a command from a user electronic device, the path extending between the user electronic device, the web could, and a device controller of the physical security subsystem.

30. The system of claim 1, wherein controlling aspects of the entire system includes the delegation of control rights of a system or part of a system to a designated, separate entity.

* * * * *